United States Patent
Uchino et al.

(10) Patent No.: US 10,637,593 B2
(45) Date of Patent: Apr. 28, 2020

(54) USER APPARATUS, AND CELL MEASUREMENT METHOD

(71) Applicant: NTT DOCOMO, INC., Tokyo (JP)

(72) Inventors: Tooru Uchino, Tokyo (JP); Hideaki Takahashi, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/516,729

(22) PCT Filed: Jan. 28, 2016

(86) PCT No.: PCT/JP2016/052509
§ 371 (c)(1),
(2) Date: Apr. 4, 2017

(87) PCT Pub. No.: WO2016/121877
PCT Pub. Date: Aug. 4, 2016

(65) Prior Publication Data
US 2017/0294977 A1 Oct. 12, 2017

(30) Foreign Application Priority Data
Jan. 29, 2015 (JP) .................. 2015-015999

(51) Int. Cl.
*H04B 17/318* (2015.01)
*H04W 24/10* (2009.01)
(Continued)

(52) U.S. Cl.
CPC ......... *H04B 17/318* (2015.01); *H04L 1/0026* (2013.01); *H04W 24/10* (2013.01);
(Continued)

(58) Field of Classification Search
None
See application file for complete search history.

(56) References Cited

U.S. PATENT DOCUMENTS

2011/0134774 A1 6/2011 Pelletier et al.
2011/0310753 A1 12/2011 Chou et al.
(Continued)

FOREIGN PATENT DOCUMENTS

EP 2528376 A1 11/2012
WO 2014/156826 A1 10/2014

OTHER PUBLICATIONS

International Search Report issued in PCT/JP2016/052509 dated Mar. 29, 2016 (3 pages).
(Continued)

Primary Examiner — David Bilodeau
(74) Attorney, Agent, or Firm — Osha Liang LLP

(57) ABSTRACT

A user apparatus configured to communicate with a base station in a mobile communication system that supports carrier aggregation, including: a management unit configured to receive, from the base station, a configuration message for adding a cell or a cell group in the carrier aggregation, and perform configuration of the cell or the cell group, and to receive, from the base station, measurement configuration information on measurement of the cell or the cell group; and a measurement unit configured to allow not to perform measurement of the cell or the cell group based on the measurement configuration information until a predetermined condition is satisfied, and to perform measurement of the cell or the cell group based on the measurement configuration information when the predetermined condition is satisfied to transmit a measurement report to the base station.

7 Claims, 20 Drawing Sheets

(51) Int. Cl.
*H04W 52/02* (2009.01)
*H04W 72/04* (2009.01)
*H04L 1/00* (2006.01)

(52) U.S. Cl.
CPC .......... *H04W 52/02* (2013.01); *H04W 72/04* (2013.01); *Y02D 70/00* (2018.01)

(56) References Cited

U.S. PATENT DOCUMENTS

| | | | | |
|---|---|---|---|---|
| 2012/0082052 A1* | 4/2012 | Oteri | .................... | H04W 24/10 370/252 |
| 2012/0281563 A1* | 11/2012 | Comsa | .................. | H04W 24/10 370/252 |
| 2013/0229931 A1 | 9/2013 | Kim | | |
| 2013/0322276 A1* | 12/2013 | Pelletier | .............. | H04W 72/085 370/252 |
| 2017/0013630 A1* | 1/2017 | Franz | .................... | H04W 24/10 |
| 2017/0208636 A1* | 7/2017 | Agiwal | .................... | H04W 8/00 |
| 2017/0265172 A1* | 9/2017 | Futaki | .................... | H04W 16/14 |
| 2018/0220303 A1* | 8/2018 | Futaki | .................... | H04W 48/18 |

OTHER PUBLICATIONS

Written Opinion of the International Searching Authority issued in PCT/JP2016/052509 dated Mar. 29, 2016 (4 pages).
3GPP TSG RAN Meeting #66; RP-142286; Nokia Corp., et al.; "LTE Carrier Aggregation Enhancement Beyond 5 Carriers"; Maui, Hawaii (US); Dec. 8-11, 2014 (9 pages).
Extended European Search Report issued in the counterpart European Patent Application No. 16743480.2, dated Feb. 13, 2018 (15 pages).
Office Action issued in the counterpart European Patent Application No. 16743480.2, dated Jan. 3, 2019 (6 pages).
Office Action issued in the counterpart European Patent Application No. 16743480.2, dated Jun. 14, 2019 (6 pages).
Office Action issued in the counterpart Japanese Patent Application No. 2016-572148, dated Sep. 10, 2019 (6 pages).

* cited by examiner

| C0 | C1 | C2 | C3 | C4 | C5 | C6 | C7 |
|----|----|----|----|----|----|----|----|
| C8 |    |    |    |    |    |    |    |
|    |    |    |    |    |    |    |    |

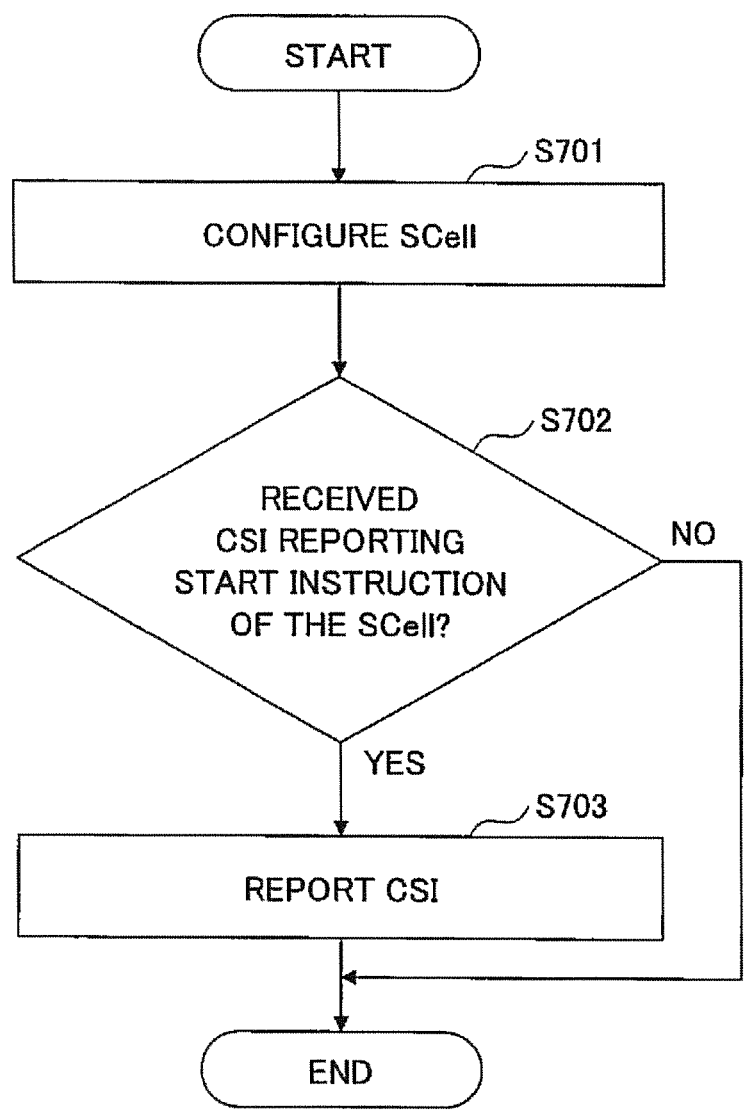

USER APPARATUS, AND CELL MEASUREMENT METHOD

TECHNICAL FIELD

The present invention relates to a technique of measurement of a cell in a mobile communication system such as LTE.

BACKGROUND ART

In the LTE system, carrier aggregation (CA: Carrier Aggregation) for performing communication by simultaneously using a plurality of carriers is adopted, in which predetermined bandwidths are used as basic units. In carrier aggregation, a carrier which is a basic unit is called a component carrier (CC: component carrier).

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to an independent cell for supporting RLM (Radio Link Monitoring) and SPS (Semi-Persistent Scheduling) and the like.

Addition and deletion of the SCell is performed by RRC (Radio Resource Control) signaling. Since an SCell is in a deactivated state right after it is set in the user apparatus UE, communication becomes available (scheduling becomes available) only by activating it.

As shown in FIG. 1, for example, in CA of Rel-10 of LTE, a plurality of CCs under the same base station eNB are used. Also, in the CA of Rel.10, as shown in FIG. 2, for example, by aggregating 5 CCs at the maximum, a high data rate is realized by expanding the band.

In Rel-12, Dual connectivity is introduced in which simultaneous communication is performed by using CCs under different base stations eNB to realize high throughputs. In Dual connectivity, the UE performs communication simultaneously using radio resources of physically different base stations eNB. Dual connectivity (to be referred to as DC hereinafter) is a kind of CA, and it is also referred to as Inter eNB CA (inter-base station carrier aggregation), in which Master-eNB (MeNB) and Secondary-eNB (SeNB) are introduced. In CA up to Rel.12, the number of configurable CCs per UE is 5 at the maximum.

RELATED ART DOCUMENT

Non Patent Document

[NON PATENT DOCUMENT 1] 3GPP TSG RAN Meeting #66 RP-142286 Maui, Hi. (US), Dec. 8-11, 2014

SUMMARY OF THE INVENTION

Problem to be Solved by the Invention

On the other hand, in LTE of Rel.13, in order to realize more flexible and faster radio communication, and in order to be able to aggregate many CCs in a contiguous unlicensed band of ultra-wideband, CA enhancement is being studied to eliminate restriction of the maximum 5 CCs that can be aggregated in CA. For example, CA is being studied for aggregating 32 CCs (=640 MHz) at the maximum (non-patent document 1). As an example, FIG. 3 shows an example of aggregating 32 CCs.

However, any concrete large capacity service that requires resources of all 32 CCs is not assumed currently. Therefore, even if a user apparatus UE that has capability of 32 CCs, it is assumed that a part of CCs is used for actual communication. The reason is that, activation of unnecessary CCs leads battery waste.

On the other hand, in a case where many SCells can be simultaneously pre-configured (blindly), operation is available in which RRC signal transmission and reception, and processing for SCell addition and deletion are omitted to enable SCell scheduling early. In this case, it can be considered that, the base station eNB tentatively configures SCells in all SCCs that the user apparatus UE supports, so that the base station eNB activates the SCell(s) when the SCell(s) become(s) usable.

The base station eNB needs to receive a report of SCell quality information from the user apparatus UE in order to determine whether the SCell is usable or not. As to the report of SCell quality information, although there are mechanisms of RRM measurement reporting and CQI(CSI) reporting, there are following problems respectively.

In RRM measurement, the user apparatus UE performs measurement according to a measurement configuration by an RRC signal. As shown in FIG. 4, after an SCell is blindly configured (step 1), the user apparatus UE always performs reporting by performing measurement periodically during the SCell is being configured (step 2). Quality measurement is necessary processing for activation (step 3) and start of scheduling (step 4). However, it wastes battery since quality measurement of the SCell is always performed. Also, in RRM measurement, when the user apparatus UE measures a deactivated SCell, there is a possibility in that communication with another cell that shares RF or internal functional blocks is disturbed (example: interruption of communication with a PCell occurs).

As to CQI reporting, currently, the user apparatus UE can only perform to feed back CQI when receiving an Activation command (activation instruction) or to feed back CQI for an activated SCell. That is, as shown in FIG. 5, unless activation (step 12) is performed after configuring the SCell blindly (step 11), CQI reporting (step 13) cannot be performed. In order to be able to always perform reporting, an activated state needs to be kept. However, as already described, there is a problem in that battery consumption is large to keep the activated state.

The present intention is contrived in view of the above-mentioned points, and an object of the present invention is to provide a technique to enable a user apparatus of a mobile communication system to perform quality measurement of a cell used in carrier aggregation while suppressing battery consumption.

Means for Solving the Problem

According to an embodiment of the present invention, there is provided a user apparatus configured to communicate with a base station in a mobile communication system that supports carrier aggregation, including:

a management unit configured to receive, from the base station, a configuration message for adding a cell or a cell group in the carrier aggregation, and perform configuration of the cell or the cell group, and to receive, from the base station, measurement configuration information on measurement of the cell or the cell group; and a measurement unit configured to allow not to perform measurement of the cell or the cell group based on the measurement configuration information until a predetermined condition is satisfied, and to perform measurement of the cell or the cell group based on the measurement configuration information when the predetermined condition is satisfied to transmit a measurement report to the base station.

According to an embodiment of the present invention, there is provided a user apparatus configured to communicate with a base station in a mobile communication system that supports carrier aggregation, including:

a management unit configured to receive, from the base station, a configuration message for adding a cell or a cell group in the carrier aggregation, and perform configuration of the cell or the cell group;

a measurement unit configured to perform measurement of a channel state of the cell or the cell group without activating the cell or the cell group that is in a deactivated state, and to transmit channel state information of the cell or the cell group to the base station; and a communication unit configured to activate the cell or the cell group when receiving an activation instruction of the cell or the cell group from the base station after transmission of channel state information of the cell or the cell group is performed by the measurement unit.

According to an embodiment of the present invention, there is provided a cell measurement method performed by a user apparatus configured to communicate with a base station in a mobile communication system that supports carrier aggregation, including:

a step of receiving, from the base station, a configuration message for adding a cell or a cell group in the carrier aggregation, performing configuration of the cell or the cell group, and receiving, from the base station, measurement configuration information on measurement of the cell or the cell group; and a step of not performing measurement of the cell or the cell group based on the measurement configuration information until a predetermined condition is satisfied, and performing measurement of the cell or the cell group based on the measurement configuration information when the predetermined condition is satisfied to transmit a measurement report to the base station.

According to an embodiment of the present invention, there is provided a cell measurement method performed by a user apparatus configured to communicate with a base station in a mobile communication system that supports carrier aggregation, including:

a step of receiving, from the base station, a configuration message for adding a cell or a cell group in the carrier aggregation, and performing configuration of the cell or the cell group;

a measurement step of performing measurement of a channel state of the cell or the cell group without activating the cell or the cell group that is in a deactivated state, and transmitting channel state information of the cell or the cell group to the base station; and a step of activating the cell or the cell group when receiving an activation instruction of the cell or the cell group from the base station after transmission of channel state information of the cell or the cell group is performed in the measurement step.

Effect of the Present Invention

According to an embodiment of the present invention, it becomes possible that a user apparatus of a mobile communication performs quality measurement of a cell used in carrier aggregation while suppressing battery consumption.

BRIEF DESCRIPTION OF THE DRAWINGS

FIG. 23 is a flowchart indicating an operation example of the user apparatus UE.

EMBODIMENTS FOR CARRYING OUT THE INVENTION

In the following, embodiments of the present invention are described with reference to figures. The embodiments described below are merely examples, and embodiments to which the present invention is applied are not limited to the embodiments below. The present embodiment is intended for a mobile communication system of LTE. However, the present invention is not limited to LTE, and can be applied to other mobile communication systems to which carrier aggregation is adopted. A "cell" that forms CA is a cell where the user apparatus UE resides, and it may be referred to as a serving cell. As an example, the "cell" that forms CA is formed by only a downlink CC or by a downlink CC and an uplink CC. Also, the release of 3GPP standard specifications of "LTE" in the present specification and the claims is a release in which CA (including DC) is introduced. However, it is not limited to this.

Also, in the following, as an example, basically, control on measurement start/stop for each cell is described. However, control of measurement start/stop for each cell group that includes a plurality of cells can be performed in the same way as the control for each cell. Although, in the following, description is given using "cell" as a measurement target like "measure a cell", the measurement target may be "carrier" like "measure a carrier". In the present embodiment, it can be considered that "measure a cell" is synonymous with "measure a carrier".

(System Whole Configuration)

Figure 1:
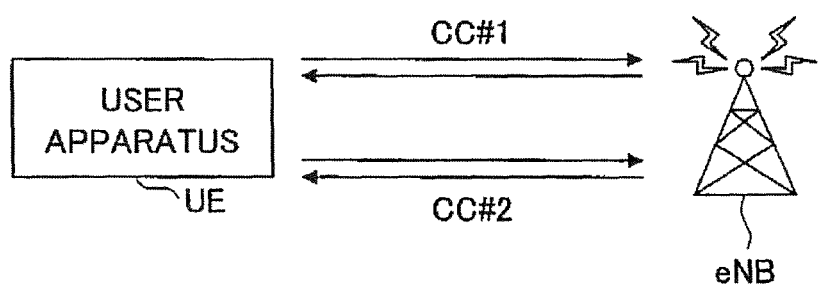
FIG. 1 is a diagram for explaining CA of Rel.10.
Figure 2:
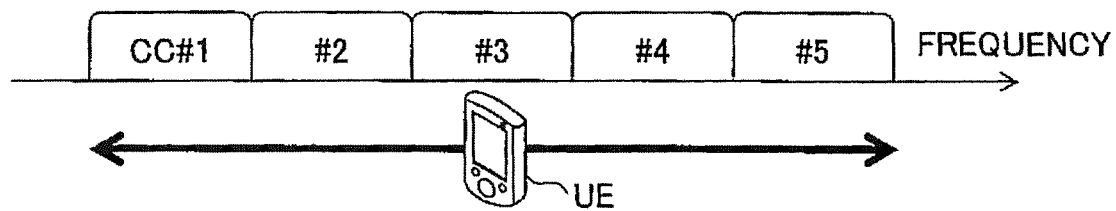
FIG. 2 is a diagram showing an example of aggregating CCs in CA of Rel.10.
Figure 3:
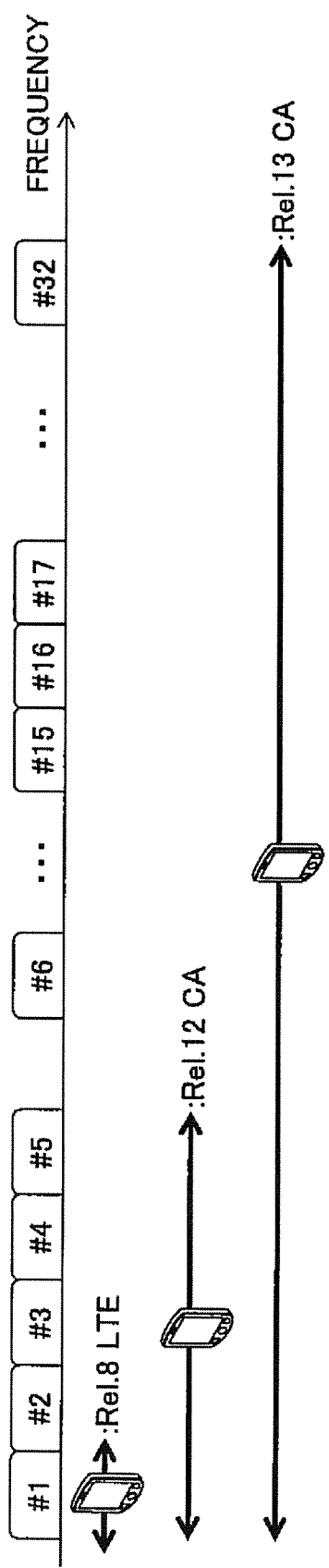
FIG. 3 is a diagram showing an example of aggregating 32 CCs in CA of Rel.13.
Figure 4:
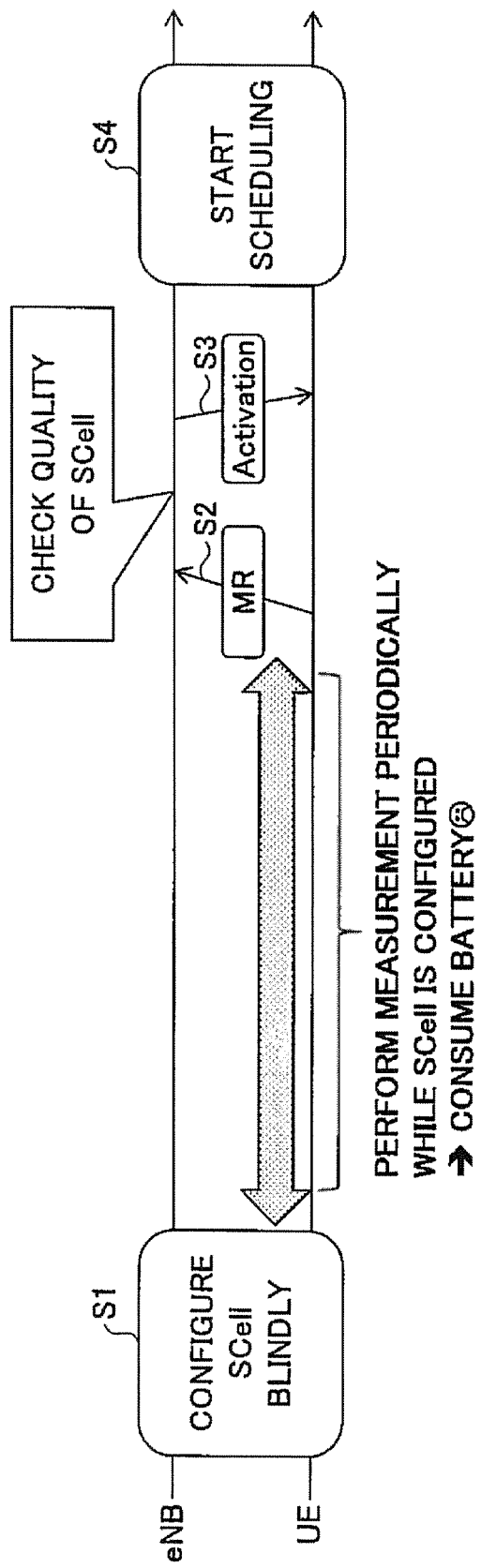
FIG. 4 is a diagram for explaining a problem.
Figure 5:
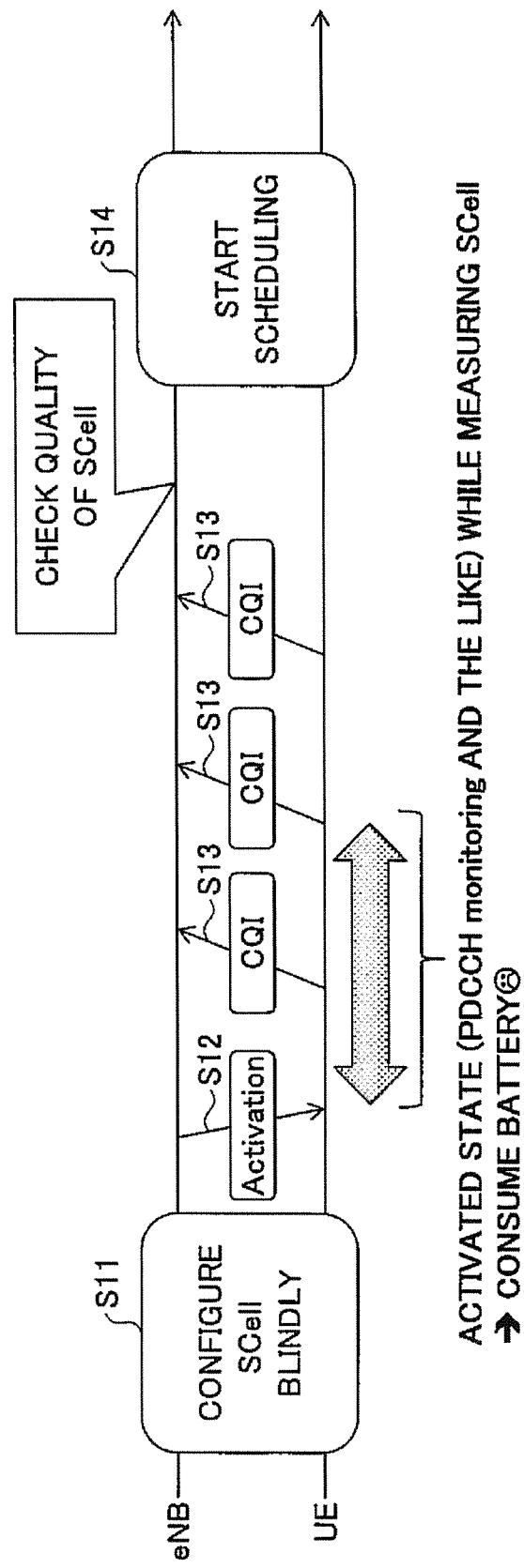
FIG. 5 is a diagram for explaining a problem.
Figure 6:
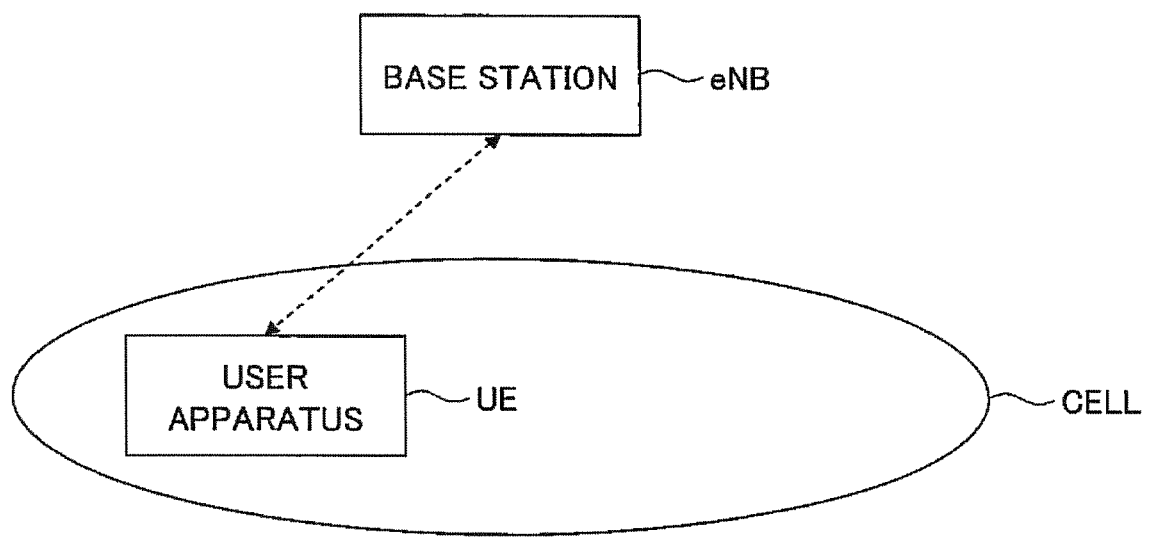
FIG. 6 is a block diagram of a system in an embodiment of the present invention.

FIG. 6 shows a block diagram of a communication system in an embodiment (common to first and second embodiments) of the present invention. As shown in FIG. 6, the communication system of the present embodiment is a mobile communication system including a base station eNB and a user apparatus UE. It is possible to perform CA communication by the base station eNB and the user apparatus UE. FIG. 6 shows one base station eNB and one user apparatus UE. However, this is for the sake of convenience of drawing, and a plurality of ones may exist respectively.

In the example of FIG. 6, although one cell is shown, this is also for the sake of convenience of drawing. There are a plurality of cells when CA is configured. Also, for example, a configuration may be adopted in which one or a plurality of RREs (remote radio equipment) that is (are) connected to the base station eNB by an optical fiber and the like in a remote place from the base station eNB is (are) provided. Also, a configuration of Dual connectivity including a plurality of base stations eNB may be adopted. When Dual connectivity is intended, it is assumed that the base station eNB described below is an MeNB that is RRC connected with the user apparatus UE. However, it may be an SeNB.

In the present embodiment (common to first and second embodiments), as described before, one or a plurality of SCells are pre-configured (blindly). Accordingly, RRC signal transmission reception and processing for SCell addition and deletion can be omitted, and SCell scheduling becomes available quickly when communication by the SCell becomes necessary and available.

Figure 7:
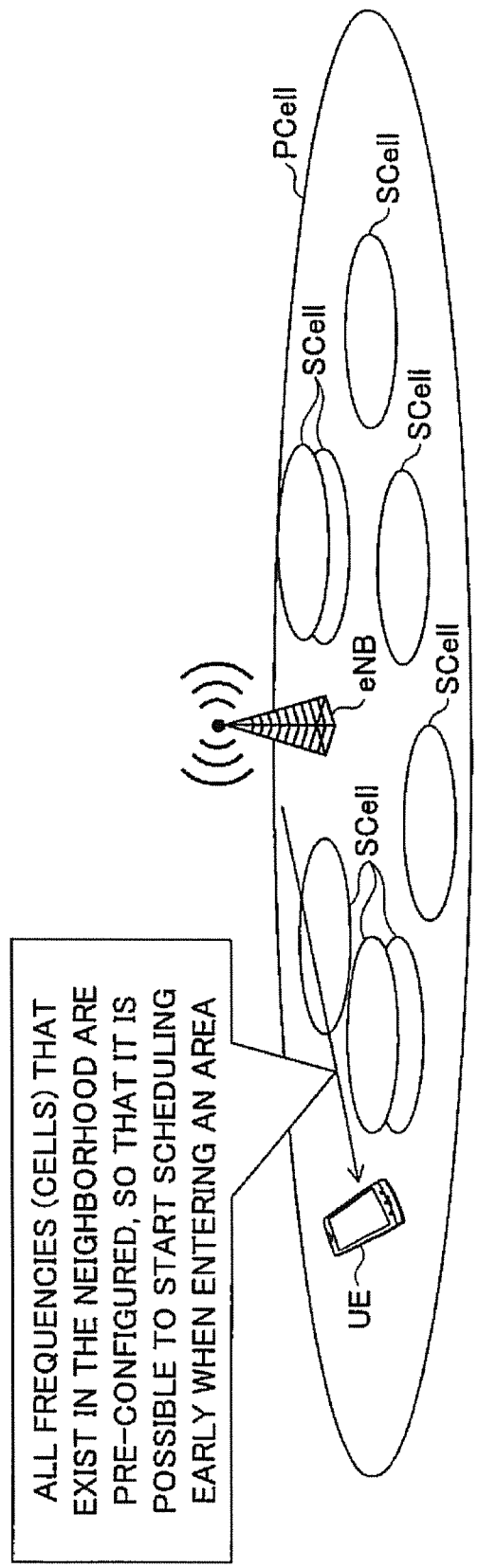
FIG. 7 is a diagram showing that many SCells are pre-configured.

FIG. 7 shows a diagram showing that a plurality of SCells are configured beforehand. In the example shown in FIG. 7, an example is shown in which all SCells in a range covered by the PCell which is a macro cell are pre-configured. By the way, SCell configuration at this time point is a state where information of the SCell is set in the user apparatus UE but is not a state where transmission and reception can be performed based on scheduling in the SCell.

In the present embodiment, by performing measurement of an SCell in the user apparatus UE more flexibly, it becomes possible to report SCell quality early while suppressing battery consumption. In the following, as concrete techniques, a first embodiment and a second embodiment are described. In the first embodiment, as a solution when using RRM measurement, a technique for dynamically performing start/stop (ON/OFF) of SCell measurement is described. In the second embodiment, as a solution when using CSI (Channel State Information), a technique for enabling CSI reporting even in a deactivated state is described.

(First Embodiment)

Figure 8:
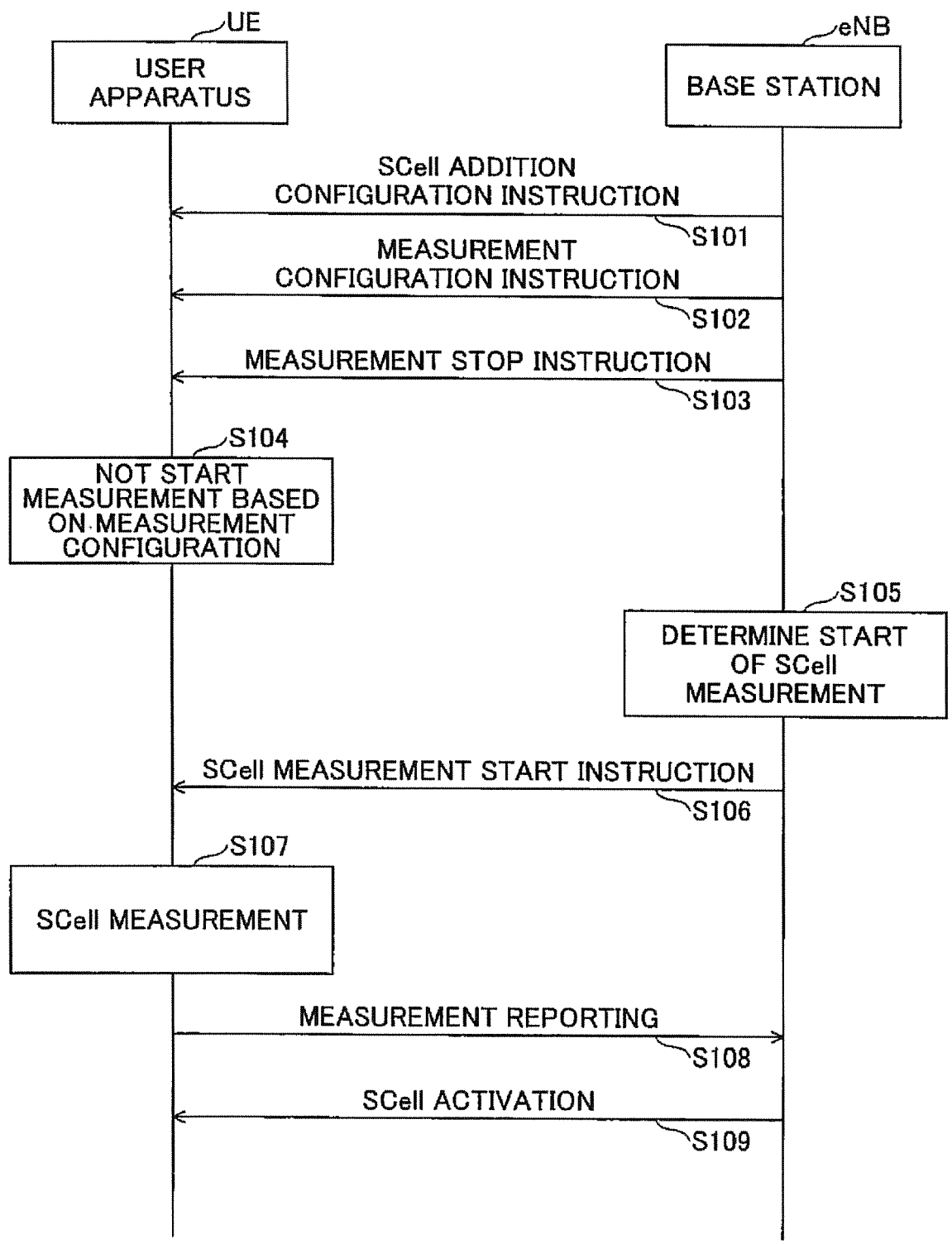
FIG. 8 is a diagram showing a process sequence in a first embodiment.

First, the first embodiment is described. In the first embodiment, in RRM measurement, instead of always performing measurement when measurement configuration is set, unnecessary measurement is stopped even when measurement configuration is set. More concrete process content is described with reference to FIG. 8. FIG. 8 is a diagram showing a process sequence in the first embodiment.

In step 101, the base station eNB transmits an SCell addition configuration instruction to the user apparatus UE, so that the user apparatus UE receives the SCell addition configuration instruction to perform addition setting of the SCell. The SCell addition configuration instruction is reported by an RRC connection reconfiguration message, for example. Also, the SCell addition configuration instruction includes an identifier (ID) of an SCell to be added. In a case of using an addition configuration instruction in units of CGs, for example, an ID of a CG to be added is included, for example.

One or a plurality of SCells to be added in step 101 is (are) not one(s) determined based on quality of current SCell(s) in the base station eNB, but is (are) predetermined one(s). As an example, as shown in FIG. 7, it is possible to predetermine all SCells in the range of the PCell to be SCells to add.

In step 102, the base station eNB transmits a measurement configuration instruction (measurement configuration) to the user apparatus UE. The user apparatus UE performs configuration instructed by the measurement configuration instruction. The measurement configuration instruction may be transmitted at the same time together with the SCell addition configuration instruction, or may be transmitted separately from the SCell addition configuration instruction. The measurement configuration instruction includes, for example, SCell (CG) and/or frequency of measurement target, measurement content (RSRP/RSRQ), reporting method (periodic, event) and the like.

In step 103, the base station eNB transmits a measurement stop instruction to the user apparatus UE. The measurement stop instruction may be transmitted simultaneously with the measurement configuration instruction or may be transmitted separately from the measurement configuration instruction. The measurement stop instruction may be transmitted by an RRC signal or may be transmitted by a MAC signal. The user apparatus UE that receives the measurement stop instruction does not start measurement/reporting based on the measurement configuration (step 104).

Operation may be performed in which, the measurement stop instruction of step 103 is omitted, and when the user apparatus UE receives the measurement configuration instruction, the user apparatus UE performs operation of not starting measurement until receiving a measurement start instruction.

As mentioned above, since the user apparatus UE does not perform SCell measurement even after receiving a measurement configuration instruction, interruption of communication due to measurement of a deactivated SCell and battery consumption due to measurement do not occur.

In step 105, the base station eNB determines to cause the user apparatus UE to start SCell measurement by detecting a predetermined trigger. The predetermined trigger is, for example, a case where the base station eNB detects that quality of another cell (for which measurement is being performed) that overlaps with an area of the SCell, configured in the user apparatus UE, for which measurement is stopped improves (example: quality becomes equal to or greater than a predetermined value). Also, when the base station eNB detects that the user apparatus UE enters an area of an SCell based on a signal received from the user apparatus UE, the base station eNB may determine to cause the user apparatus UE to start measurement of the SCell. In a case where control is performed in units of CG, for example, the trigger may be that, as to one or a plurality of cells included in the CG, quality of another cell (cell of another CG) that overlaps with an area of the one or a plurality of cells improves.

The base station eNB that determines measurement start transmits an SCell measurement start instruction to the user apparatus UE (step 106). The SCell measurement start instruction includes an identifier (ID) of an SCell to start measurement. The identifier may be indicated as a bit position of a signal. In the present embodiment, although the SCell measurement start instruction is transmitted by a MAC signal (MAC CE), it may be transmitted by a physical signal (PDCCH and the like) or an RRC signal.

The user apparatus UE that receives the SCell measurement start instruction starts measurement of the SCell instructed to start measurement according to the measurement configuration (step 107), and transmits a measurement report to the base station eNB (step 108). When the base station eNB determines that quality of the SCell is sufficiently good based on the measurement report, the base station eNB transmits an instruction to activate the SCell to the user apparatus UE (step 109). By the way, in the case of control in units of CG, "measuring a CG" may be to measure all cells included in the CG or to measure a part of the cells.

Figures 9, 10:
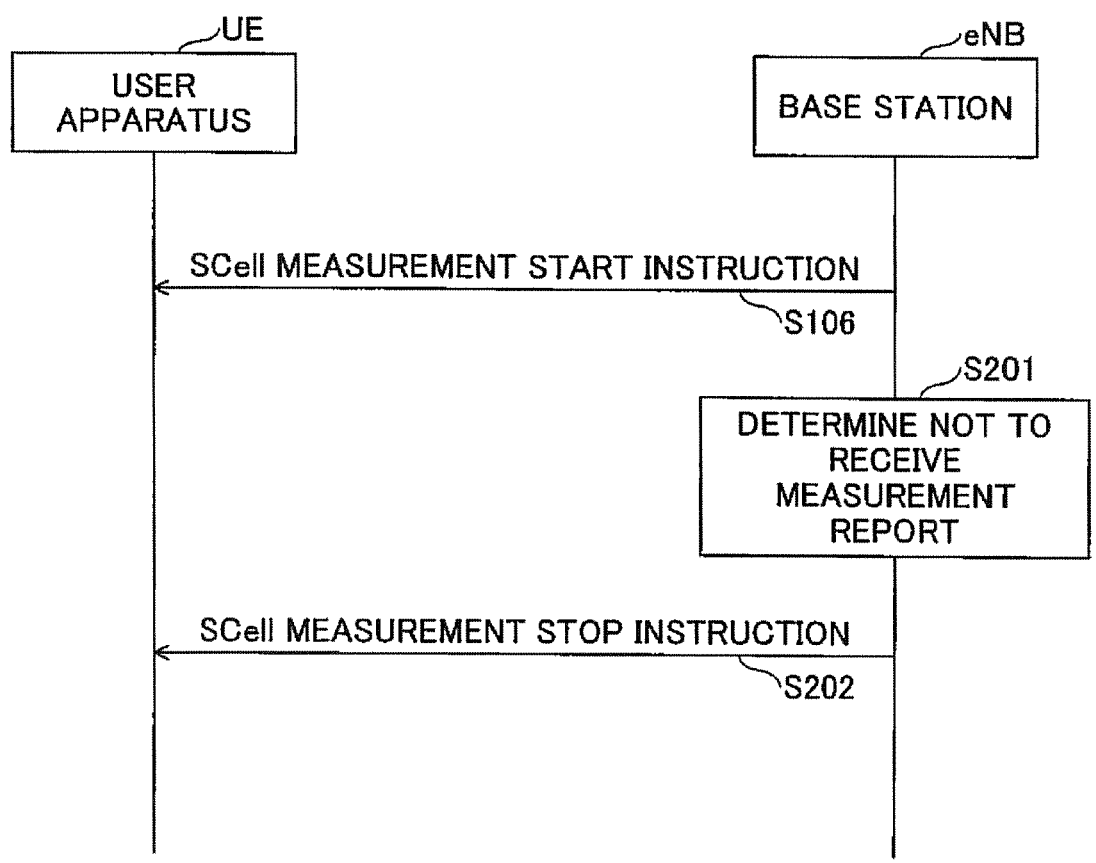
FIG. 9 is a diagram showing an example of a MAC CE for performing start/stop of SCell measurement.
FIG. 10 is a diagram for explaining operation in a case where a measurement report cannot be received.

As described above, measurement start/stop instruction can be performed by a MAC signal (MAC CE). FIG. 9 shows an example of a MAC CE (Measurement activation MAC CE) used for the measurement start/stop instruction. Each box in which C0 and the like is shown indicates a bit position. Ci in FIG. 9 is a flag for starting or stopping measurement of SCell#i, in which, for example, 1 indicates start and 0 indicates stop (they may be reversed). Also, in the case where control is performed in units of CG, for example, Ci in FIG. 9 may be regarded as a flag for starting or stopping measurement of CG#i.

As shown in FIG. 10, even when the base station eNB transmits a measurement start instruction to the user apparatus UE (step 106), if the base station eNB cannot receive a measurement report on the SCell from the user apparatus UE (step 201), the base station eNB transmits an SCell measurement stop instruction to the user apparatus UE (step 202). In this case, since there is a possibility in that the user apparatus UE is performing useless measurement operation, the operation can be stopped by transmitting the SCell measurement stop instruction. The SCell measurement stop instruction of this case may be also performed using a MAC CE as mentioned above.

Also, as a trigger for the user apparatus UE to stop measurement, in addition to regarding reception of a measurement stop instruction as a trigger, it may be regarded as a trigger that a predetermined period elapses after the user apparatus UE receives an SCell measurement start instruction.

Figure 11:
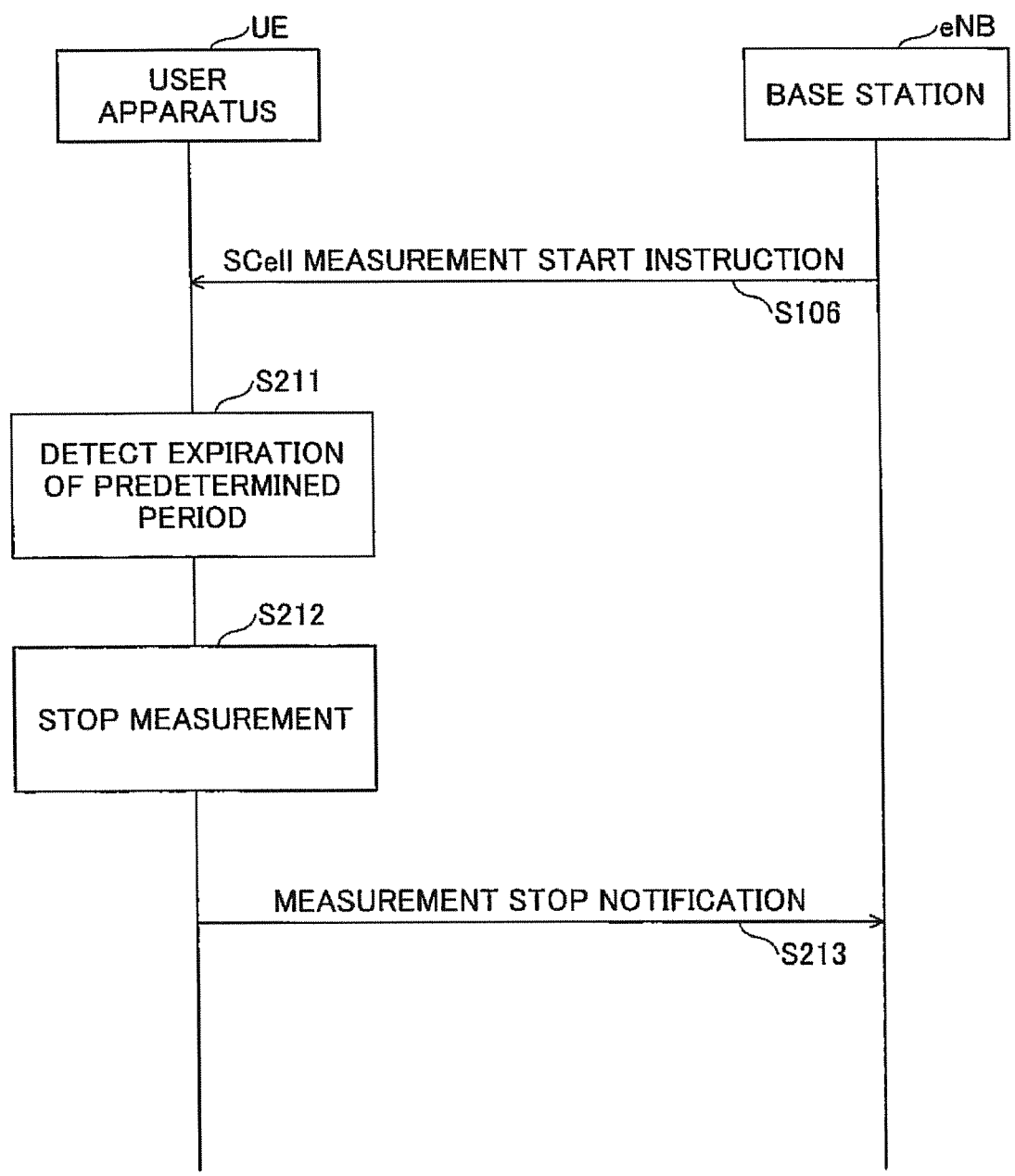
FIG. 11 is a diagram for explaining operation in which the user apparatus UE autonomously performs measurement stop.

FIG. 11 shows a sequence example in a case where elapse of a predetermined period is used as a stop trigger. At the time point when the user apparatus UE receives an SCell measurement start instruction (step 106), the user apparatus UE starts a timer. Then, the user apparatus UE detects elapse of a predetermined period by expiration of the timer (step 211) to stop SCell measurement related to the SCell measurement start instruction (step 212). In the example of FIG. 11, the user apparatus UE notifies the base station eNB that SCell measurement stop is autonomously performed by an RRC signal (step 213). This notification may not be performed. The timer value used for determination of the expiration of the predetermined period is notified to the user apparatus UE by the measurement configuration instruction in step 102 of FIG. 8, for example. By performing such a control of autonomous measurement stop, it becomes possible to save radio resources for a control signal.

By the way, in a case where the user apparatus UE receives an SCell measurement start instruction again until before expiration of the timer after the start of the timer, the user apparatus UE may restart the timer. The timer starts from 0 again from the time point of restart.

Figure 12:
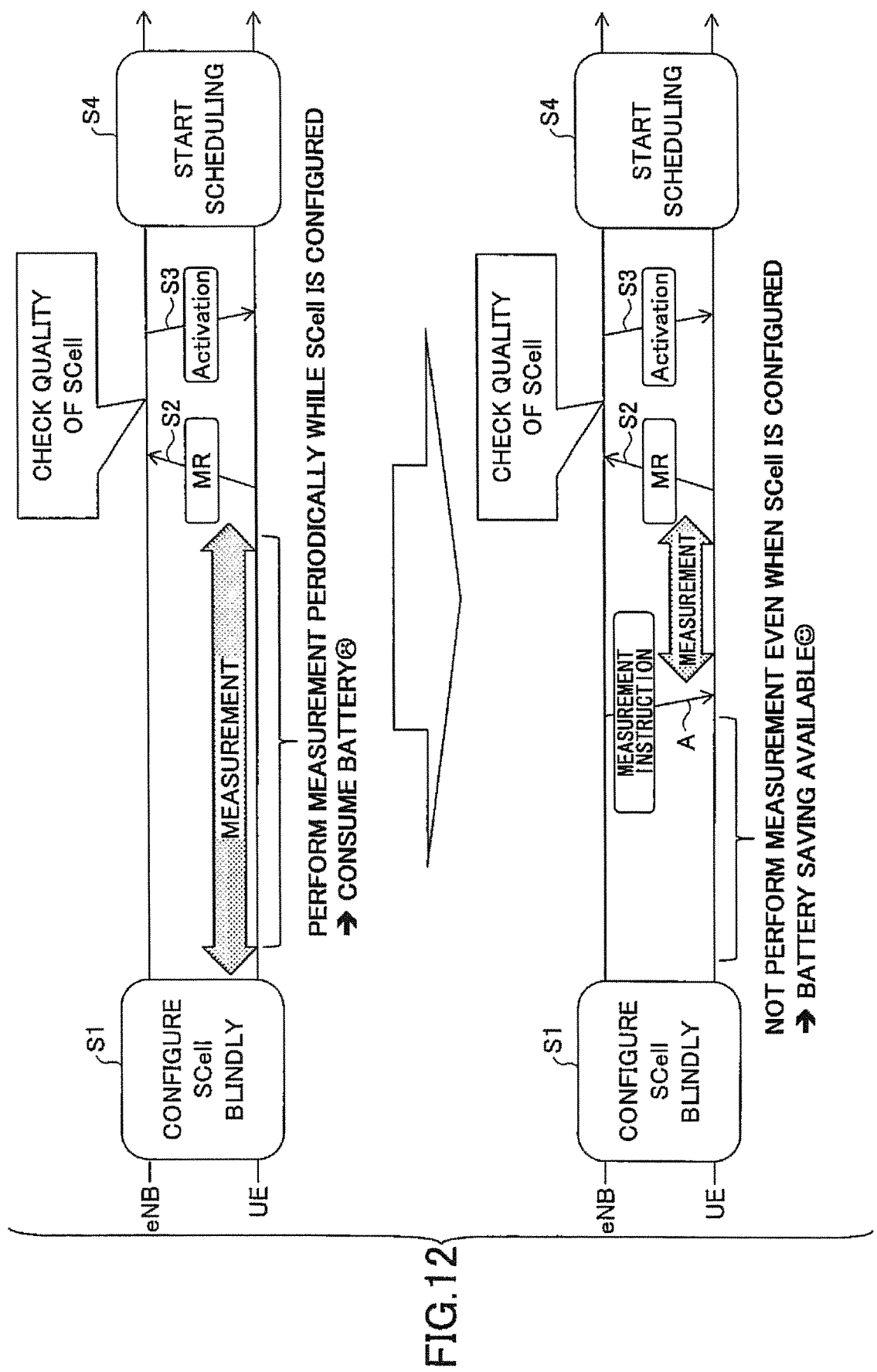
FIG. 12 is a diagram for explaining an effect in processing in the first embodiment.

FIG. 12 is a diagram showing that the problem of the case using the conventional measurement method is solved by the technique of the first embodiment. As shown in the upper side of FIG. 12, in the case where the conventional measurement method is used, during the SCell is configured, measurement is periodically performed so that the battery is wasted. On the other hand, in the present embodiment shown in the lower side of FIG. 12, measurement of the SCell is not performed unless a measurement instruction shown as A is received. Thus, battery saving becomes possible. This effect also applies to the following modified examples.

(Modified Example 1 in the First Embodiment)

In the process sequence (to be referred to as a basic example) described with reference to FIG. 8 and the like, the user apparatus UE executes start/stop of SCell measurement according to the measurement start/stop instruction from the base station eNB. However, this is an example of a predetermined condition for start/stop, and the user apparatus may perform start/stop autonomously as another operation.

Figure 13:
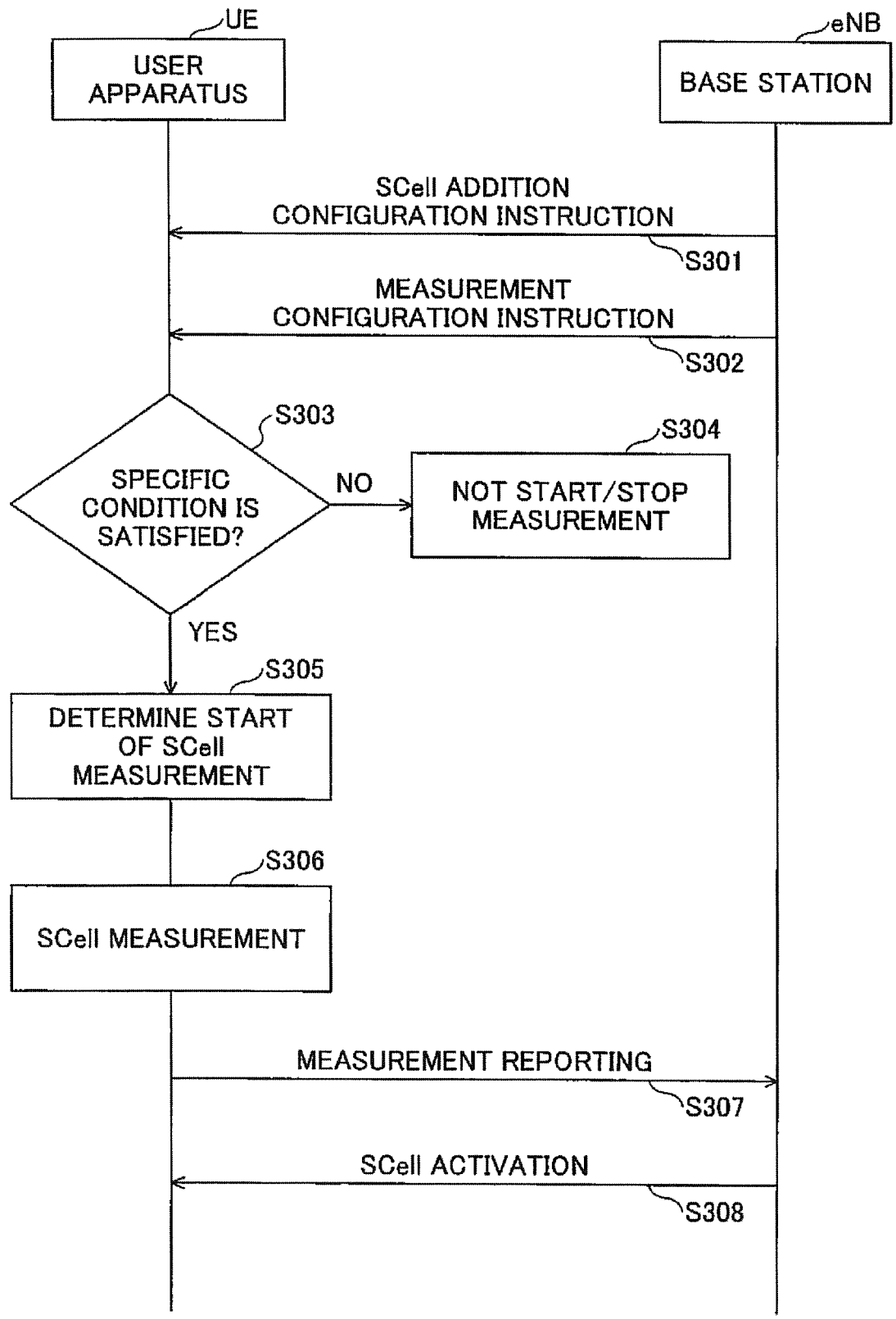
FIG. 13 is a diagram showing a process sequence of a modified example 1 in the first embodiment.

A process sequence in a case (to be referred to as modified example 1) where the user apparats UE performs autonomously start/stop is described with reference to FIG. 13.

First, like steps 101 and 102 in the basic example, the user apparatus UE receives an SCell addition configuration instruction from the base station eNB (step 301), and receives a measurement configuration instruction (step 302). In the present modified example, different from the basic example, the user apparatus UE does not receive any of the SCell measurement stop instruction and the SCell measurement start instruction from the base station eNB.

The user apparatus UE that receives the measurement configuration instruction does not start SCell measurement based on the measurement configuration unless the user apparatus UE determines that a specific condition is satisfied.

In step 303, the user apparatus UE decides whether the specific condition is satisfied or not. This decision may be performed periodically, for example. When the user apparatus UE decides that the specific condition is not satisfied (No in step 303), the user apparatus UE does not start SCell measurement, or, the user apparatus UE stops SCell measurement that is already started (step 304).

When the user apparatus UE decides that the specific condition is satisfied (Yes in step 303), the user apparatus determines to start SCell measurement (step 305), and performs SCell measurement (step 306) to transmit a measurement report to the base station eNB (step 307). When the base station eNB determines that SCell quality is good, the base station eNB activates the SCell (step 308).

In the following, as an example of the above-mentioned specific condition, a condition example 1 and a condition example 2 are described. The following condition example 1 and condition example 2 are conditions related to decision by the user apparatus UE. However, the base station eNB may use the condition example 1 and the condition example 2 so that the base station eNB may perform transmission determination of a measurement start/stop instruction based on these conditions.

CONDITION EXAMPLE 1

In the condition example 1, when the user apparatus UE detects that a quality of a specific cell for which quality measurement is performed becomes lower than a predetermined value, the user apparatus UE starts measurement of an SCell, and when the quality of the specific cell becomes higher than a predetermined value, the user apparatus UE stops measurement of the SCell.

That is, the condition example 1 is one in which SCell measurement is performed for using a new SCell in order to compensate for throughput deterioration due to quality deterioration of the specific cell. The "specific cell" may be a PCell, may be a cell designated from the base station eNB by an RRC signal and the like, may be one whose cell identifier (CellIndex/SCellIndex and the like) is the largest or the smallest, or may be an SCell to which a PUCCH is set. Also, the quality which is compared with the predetermined value may be RSRP, or may be RSRQ. In a case where control is performed in units of CG, "specific CG" corresponding to the above "specific cell" can be a CG including a PCell, for example. Also, quality of the "specific CG" may be a quality of a specific cell (example: PCell) in the specific CG, or may be a total (example: value corresponding to throughput that CG can realize) of qualities of each cell included in the "specific CG".

CONDITION EXAMPLE 2

In the condition example 2, when the user apparatus UE detects that the number of serving cells (cells for which quality measurement is being performed) that satisfy a specific quality condition becomes equal to or greater than a predetermined value (when quality of each cell exceeds a predetermined threshold), the user apparatus UE stops measurement of an SCell (example: SCell, that is not yet activated, for which measurement has been started), and when the user apparatus UE detects that the number of serving cells that satisfy a specific quality condition becomes less than a predetermined value, the user apparatus UE may start measurement of the SCell.

The threshold (predetermined value) in the condition example 1 and the condition example 2 is a value set by an RRC signal and the like from the base station eNB, for example. This threshold may be set for each UE, may be set for each cell, or may be set for each cell group. By the way, as to the condition example 2, when control is performed in units of CG, a decision method the same as the above-mentioned method may be used, or decision may be performed using the number of CGs that satisfy the specific quality condition instead of using the number of cells that satisfy the specific quality condition.

Also, as to the control in which the user apparatus UE autonomously performs measurement start/stop in this modified example, the user apparatus UE may perform it when there is an instruction to perform autonomous control from the base station eNB to the user apparatus UE, and when there is not the instruction, the user apparatus UE may perform control of the basic example.

(Modified Example 2 Of The First Embodiment)

The current LTE system is operated by licensed bands assigned to telecommunications carriers. On the other hand, in order to absorb increasing user traffic, it is necessary to further add frequency bands. However, bands of the licensed bands are limited. So, it is being considered, in Rel-13, as LAA (Licensed Assisted Access), to extend bands by utilizing bands (unlicensed bands) as LTE, other than the licensed bands, that can be used.

In an unlicensed band, when there is another apparatus that is performing communication by the frequency, it is prohibited to perform communication. Therefore, when performing communication in LAA, it is necessary to confirm that there is no other communication using the unlicensed band. This is called LBT (Listen Before Talk).

In DL transmission of the base station eNB side, when LBT becomes NG, DL transmission (including Reference Signal) is stopped, so that, from the viewpoint of the user apparatus UE, the user apparatus UE appears to go out of the area of the cell of the frequency.

On the other hand, in such a case, since measurement reports (SCell quality deteriorated) are reported at the same time via a license band from user apparatuses UE connected to LAA, it is not desirable in terms of resource efficiency.

Then, in the modified example 2, in the case of performing LAA, based on the result of DL LBT in the base station eNB, the user apparatus UE is caused to stop LAA cell (cell of unlicensed band) measurement in the same way as the basic example (FIG. 8).

Figure 14:
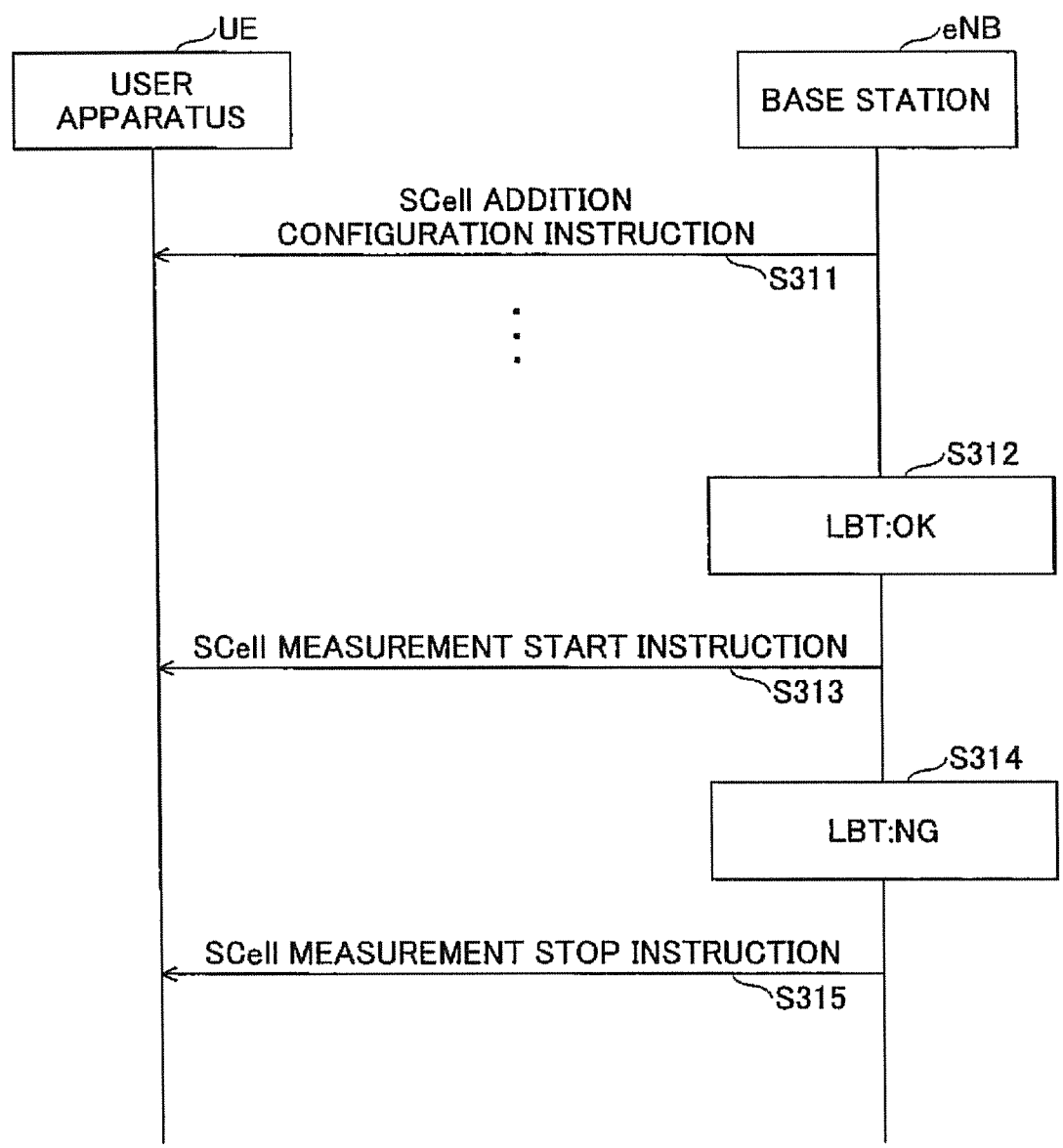
FIG. 14 is a diagram showing a process sequence of a modified example 2 in the first embodiment.

FIG. 14 shows a process sequence example of the modified example 2. Like the basic example, after SCell addition configuration instruction (step 311), measurement configuration instruction and SCell measurement stop instruction are performed, when the base station eNB detects LBT:OK in the frequency (corresponding to the configured SCell) in the unlicensed band in step 312, the base station eNB transmits a measurement start instruction on the SCell to the user apparatus UE (step 313). Accordingly, the user apparatus UE starts measurement of the SCell.

When the base station eNB detects LBT:NG in the frequency in step 314, the base station eNB transmits a measurement stop instruction on the SCell to the user apparatus UE (step 315). Accordingly, the user apparatus UE stops measurement/reporting of the SCell.

By the way, if the base station eNB individually notifies each UE of the above-mentioned measurement start/stop instruction via a licensed band, a large amount of signals of C-plane are transmitted by radio. Therefore, the measurement start/stop instruction may be notified by a broadcast signal (system information) in the licensed band side. By the broadcast signal, each UE is notified of stop/start of measurement, identifier and frequency of the target cell, and the like.

(Second Embodiment)

Next, the second embodiment is described. In the second embodiment, the user apparatus UE performs CSI reporting on an SCell that is in a deactivated state. This state may be called a pre-activation state. In a case where the SCell is in an activated state, operation such as SRS transmission, PDCCH monitoring, sCellDeactivationTimer launch and the like is performed in addition to CSI (CQI and the like) reporting. However, in the present embodiment, since only CSI reporting is performed, it is possible to suppress battery consumption compared with the activated state.

Figure 15:
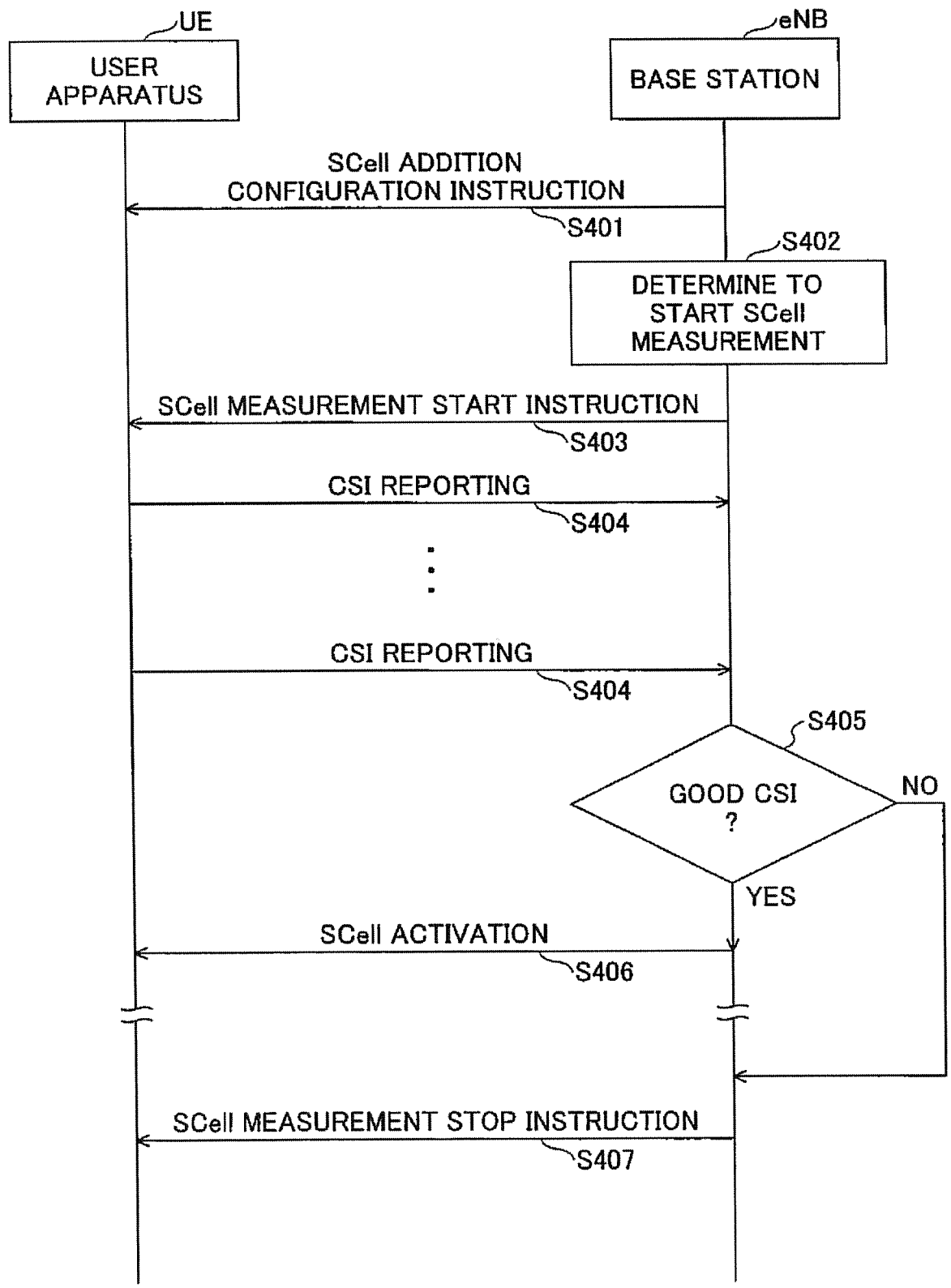
FIG. 15 is a diagram showing a process sequence in a second embodiment.

More concrete process content is described with reference to FIG. 15. FIG. 15 is a diagram showing a process sequence in the second embodiment.

In step 401, the base station eNB transmits an SCell addition configuration instruction to the user apparatus UE, so that the user apparatus UE receives the SCell addition configuration instruction to perform addition configuration of the SCell. At this stage, each SCell is in a deactivated state, and keeps the deactivated state until receiving an activating instruction from the base station eNB. The SCell addition configuration instruction is notified by an RRC connection reconfiguration message, for example. Also, the SCell addition configuration instruction includes, for example, an identifier (ID) of an SCell to be added. In the case where control is performed in units of CG, the addition configuration instruction includes, for example, an ID of a CG.

The one or a plurality of SCells to be added in step 401 is (are) not one(s) determined based on quality of current SCells in the base station eNB, but is (are) predetermined SCell(s).

In step 402, the base station eNB determines to cause the user apparatus UE to start SCell measurement (CSI measurement of frequency carrier of SCell) by detecting a predetermined trigger. The predetermined trigger may be, for example, the same as the trigger in step 105 of FIG. 8 in the first embodiment.

The base station eNB that determines measurement start transmits an SCell measurement start instruction to the user apparatus UE (step 403). The SCell measurement start instruction includes an identifier (ID) of an SCell to start measurement. In the case of control in units of CG, for example, an ID of a CG is included. The identifier may be indicated as a bit position of a signal. Also in the present embodiment, like the first embodiment, although the SCell measurement start instruction is transmitted by a MAC signal (MAC CE), it may be transmitted by a physical signal (PDCCH and the like) or an RRC signal. Also, an example of a format of a MAC CE when using a MAC signal may be that shown in FIG. 9.

The user apparatus UE that receives the SCell measurement start instruction performs CSI measurement on the added SCell without activating the SCell to transmit a CSI to the base station eNB (step 404). In the case where control is performed in units of CG, the user apparatus UE performs CSI measurement for all or a part of cells of the added CG without activating each cell in the added CG to transmit a CSI to the base station eNB.

When the base station eNB receives a CSI indicating a good quality for an SCell (Yes in step 405), the base station eNB activates the SCell (step 406). Also, in the case where control is performed in units of CG, when the base station eNB receives a CSI indicating a good quality for a part of cells in the CG, the base station eNB may activate the CG, or when the base station eNB receives a CSI indicating good quality in all cells in the CG, the base station eNB may activate the CG.

Also, when the base station eNB does not receive the CSI indicating a good quality for an SCell for which measurement start is instructed (No in step 405), the base station eNB may cause the user apparatus UE to stop CSI measurement for the SCell (step 407). The SCell measurement stop instruction in step 407 may be performed by a MAC CE using the format of FIG. 9, for example, in the same way as the measurement start instruction.

In the above-mentioned processing, as to a timing for starting CSI measurement/reporting (step 404) from when the user apparatus UE receives an SCell measurement start instruction in step 403, for example, it is after a predetermined period (example: 8 ms the same as that in activated state) from when receiving the SCell measurement start instruction.

As to an UL radio resource (time/frequency resource) for the user apparatus UE to perform CSI reporting of the SCell, it is configured beforehand from the base station eNB when adding the SCell in step 401, for example.

Also, as an UL resource for the user apparatus UE to perform CSI reporting of the SCell, a resource prepared for CSI reporting for another cell (example: PCell) may be diverted. That is, in this case, a part or all of CSI reports of the PCell may be stopped, so that CSI reporting for the designated SCell may be performed instead of that. In the case of control in units of CG, when an UL resource for CSI reporting is prepared in units of CG, an UL resource for another CG may be used. Also, even when performing control in units of CG, in the same way as the above-mentioned one, a resource prepared for CSI reporting of another cell such as PCell may be diverted.

When CSI reporting of an SCell of a deactivated state collides with CSI reporting of a cell (PCell or SCell) of an activated state, CSI of the SCell of the deactivated state may be dropped. Or, CSI of a cell whose CellIndex is small (or large) may be dropped preferentially. It is merely an example to select a cell whose CellIndex is small (or large). It is only necessary to determine a cell to drop preferentially by a method in which recognition of a cell where CSI is dropped matches between the user apparatus UE and the base station eNB when CSIs of a plurality cells collide.

Also, an UL resource for a cell in a deactivated state may be configured, so that the UL resource may be shared between cells.

For example, in a state of "SCell#1 (deactivated state: CSI reporting OFF), SCell#2 (deactivated state: CSI reporting OFF)", an UL resource shared between SCell#1/2 is set. The configuration of the shared resource may be performed from the base station eNB to the user apparatus UE by an RRC signal, or by a MAC signal or by a physical signal. Also, the signal for the configuration may include information for specifying the UL resource and identifiers of a plurality of cells sharing the UL resource.

After that, the user apparatus UE is caused to start measurement in the SCell#1 by a measurement start instruction, and to perform CSI reporting using the shared UL resource. At this time, the state becomes "SCell#1 (deactivated state: CSI reporting ON), SCell#2 (deactivated state: CSI reporting OFF)".

After measurement is caused to start in the SCell#1, when a valid CSI is not reported in the SCell#1, the base station eNB instructs the user apparatus UE to stop CSI reporting in the SCell#1 and to perform CSI reporting in the SCell#2. Accordingly, the state becomes "SCell#1 (deactivated state: CSI reporting OFF), SCell#2 (deactivated state: CSI reporting ON)".

As mentioned above, by sharing the UL resource in an time division manner, smaller amount of UL resources are required for deactivated cells. The scheme to share an UL resource in a time division manner can be utilized also in control in units of CG. That is, for example, in the same way as the UL resource sharing between the SCell#1 and the SCell#2, an UL resource can be shared between a CG#1 and a CG#2.

Although SCell measurement stop is performed by an SCell measurement stop instruction from the base station eNB to the user apparatus UE in the process sequence example shown in FIG. 15, also in the second embodiment, in the same way as the method described with reference to FIG. 11, the user apparatus UE may autonomously stop measurement after a predetermined period from when the user apparatus UE receives a measurement start instruction. Also, as to setting of a value of a timer and restart processing of a timer, control similar to that of the first embodiment can be performed. Also, as to start of SCell measurement, UE may autonomously determine it using the condition described in the modified example 1 of the first embodiment.

In the second embodiment, the above-mentioned control for CSI reporting may be applied only to CQI in "CSI" and may not be applied to RI, PTI and the like. That is, in processes described so far, "CSI" may be replaced with "CQI". Also, in a case where there is no valid UL resource for CSI reporting (example: when TA timer expires), CSI reporting may not be performed.

Figure 16:
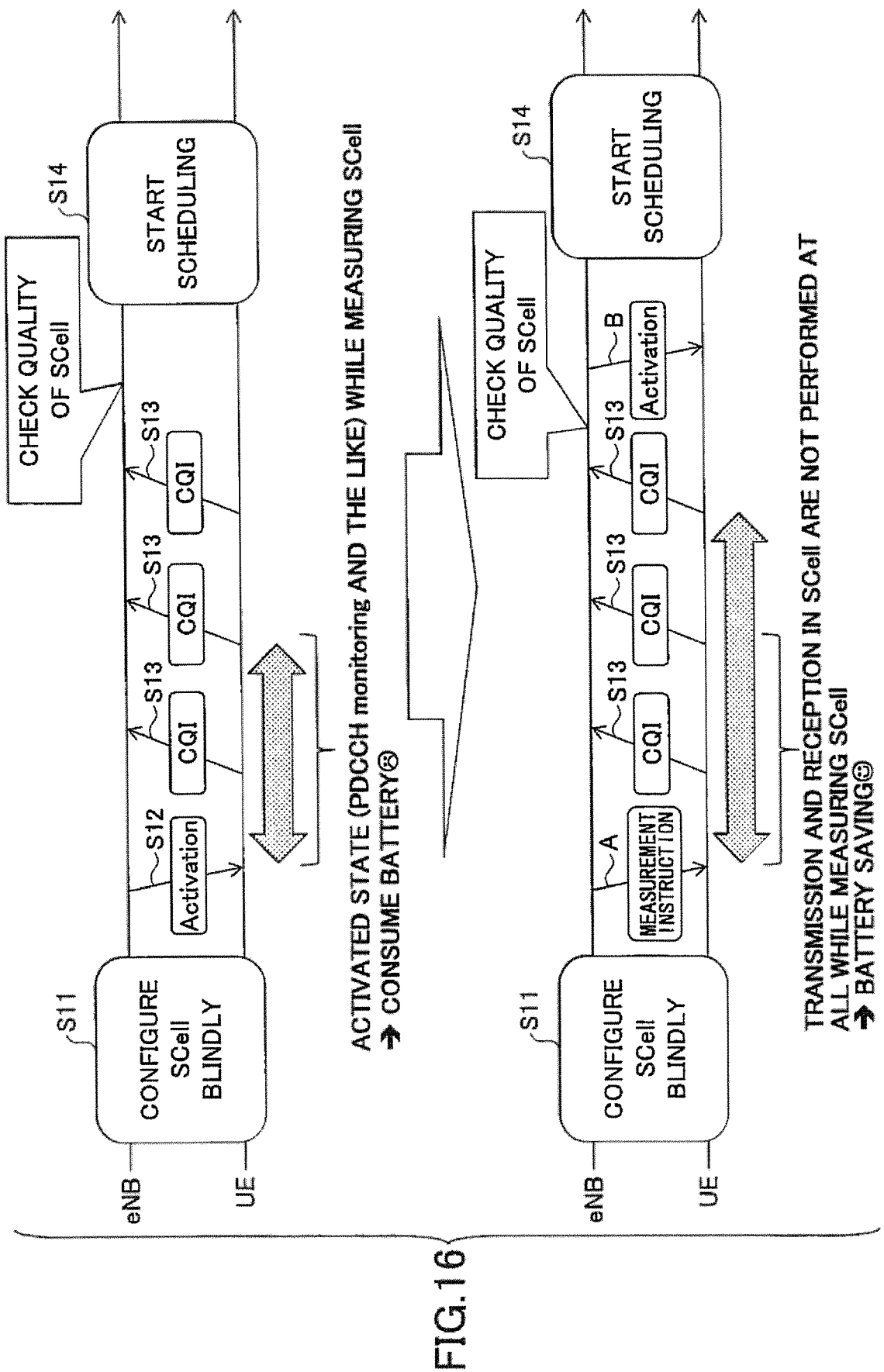
FIG. 16 is a diagram for explaining an effect in the second embodiment.

FIG. 16 is a diagram showing that a problem of the case where the conventional CSI(CQI) reporting method is used is solved by the technique in the second embodiment. As shown in the upper side of FIG. 16, when the conventional method is used, CQI reporting (step 13) cannot be performed unless the SCell is activated (step 12). Thus, battery is wasted since PDCCH monitoring and the like is performed during measurement of the SCell. On the other hand, in the present embodiment shown in the lower side of FIG. 16, the user apparatus UE receives a measurement instruction indicated by A, so that the user apparatus UE performs CQI reporting of an SCell without activating the SCell. Thus, battery saving becomes possible.

Each of the base station eNB and the user apparatus UE may include both functions of the first and the second embodiments, or one of them.

(Capability Notification)

As already described, in terms of battery saving, it is not desirable to activate all of configured SCells at the same time. Also, the number of cells that can be activated at the same time depends on battery efficiency of the user apparatus UE. However, currently, capability on the number of cells that can be activated at the same time does not exist. Thus, the base station eNB cannot discriminate the number of cells that can be activated at the same time in the user apparatus UE. Therefore, for example, there is a possibility in that the base station eNB instructs activation of a number of SCells equal to or greater than the capability of the user apparatus UE.

Therefore, in the present embodiment (common to first and second embodiments), as to cells (example: SCells) formed by CCs/bands included in a CA band combination that the user apparatus UE supports, the user apparatus UE notifies the base station eNB of capability information indicating up to how many cells can be activated at the same time (durable in terms of battery saving). The notification of the capability information may be performed in units of UE, or may be performed in units of band combination. In the case of in units of UE, for example, X (number) is designated for a UE, so that X is applied to every band combination that can be configured to the UE. Also, in the case of in units of band combination, designation is performed such that, for example, X is designated for band combination 1 and Y is designated for band combination 2, for example.

Figure 17:
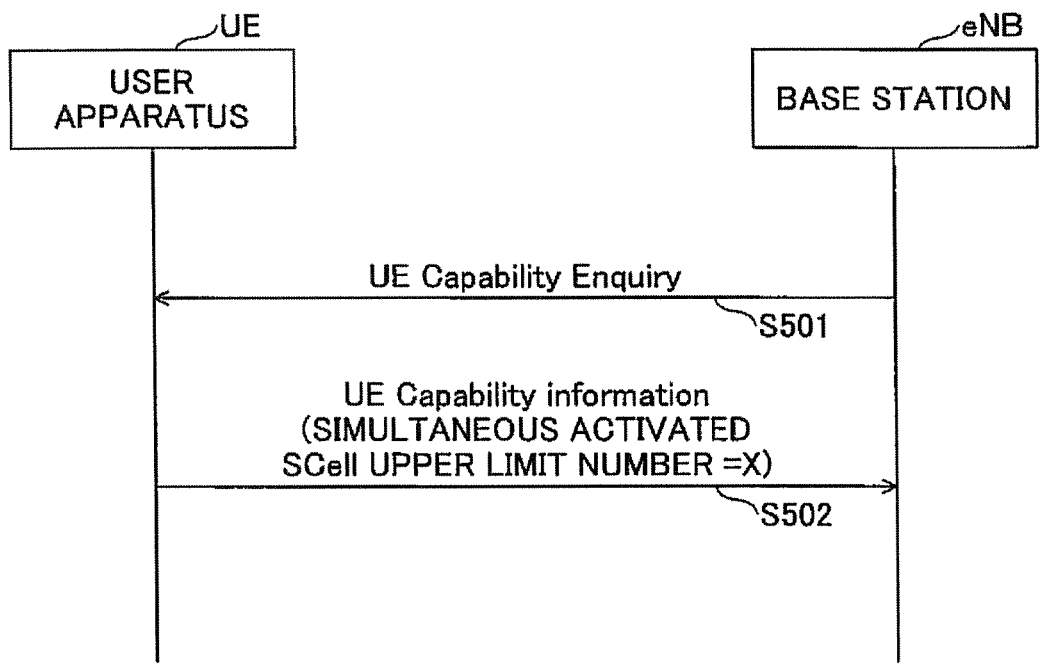
FIG. 17 is a diagram for explaining a notification method of Capability.

FIG. 17 shows a procedure example of capability notification. For example, when the user apparatus UE performs RRC connection to the base station eNB, the user apparatus UE receives a UE capability enquiry from the base station eNB (step 501), and the user apparatus UE transmits capability information (UE Capability information) including the number of cells that can be activated to the base station eNB (step 502).

Also, the user apparatus may notify the base station eNB of the number of CGs that can be activated at the same time as capability information.

(Apparatus Configuration Example)

Next, main configurations of the user apparatus UE and the base station eNB that are able to execute all processes described so far are described.

Figure 18:
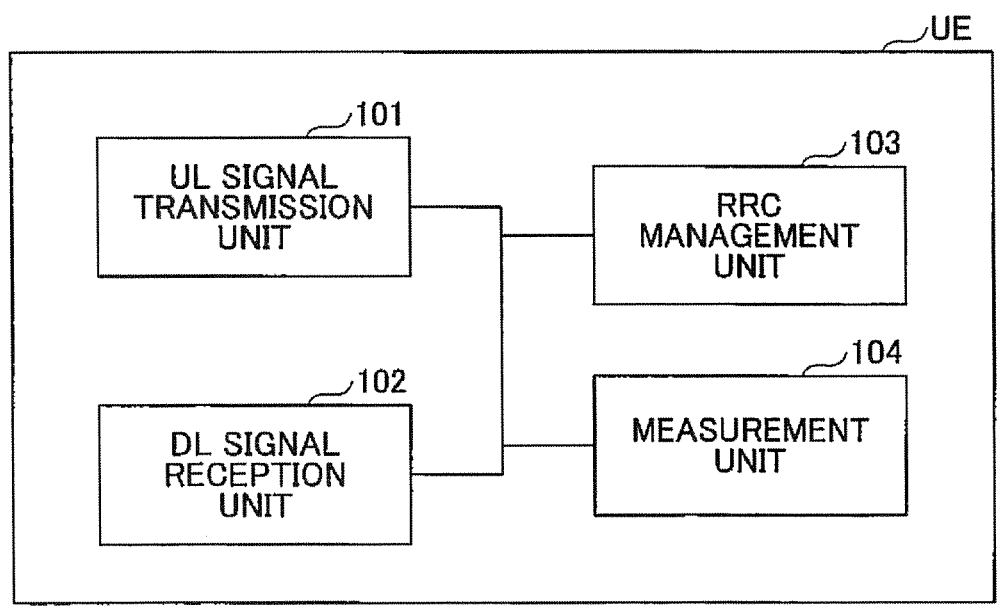
FIG. 18 is a block diagram of a user apparatus UE.

FIG. 18 shows a functional block diagram of the user apparatus UE in the present embodiment. As shown in FIG. 18, the user apparatus UE includes an UL signal transmission unit 101, a DL signal reception unit 102, an RRC management unit 103, and a measurement unit 104. FIG. 18 only shows functional units especially related to the embodiment of the present invention in the user apparatus UE, and the user apparatus UE also includes at least functions, not shown in the figure, for performing operation complying with LTE. Also, the configuration shown in FIG. 18 is merely an example, and, any functional segmentations and any names of functional units can be used as long as the user apparatus UE can execute processing described in the present embodiment.

The UL signal transmission unit 101 includes functions configured to generate various signals of physical layer from an upper layer signal to be transmitted from the user apparatus UE, and transmit the signals by radio. The DL signal reception unit 102 includes functions configured to receive various signals from a base station eNB by radio and obtain a signal of an upper layer from the received physical layer signals. Each of the UL signal transmission unit 101 and the DL signal reception unit 102 includes a function for executing CA for performing communication by aggregating a plurality of CCs (including functions for performing SCell (or CG) activation/deactivation). The UL signal transmission unit 101 and the DL signal reception unit 102 may be referred to as a communication unit as a whole.

It is assumed that each of the UL signal transmission unit 101 and the DL signal reception unit 102 includes a packet buffer and performs processing of layer 1 (PHY), and layer 2 (MAC, RLC, PDCP). But, it is not limited to this.

The RRC management unit 103 includes functions for performing processes of setting/changing/management of CA information such as added SCell and the like, configuration change and the like in addition to performing transmission and reception of an RRC signal with the base station eNB. Also, the RRC management unit 103 includes a function configured to hold information of capability of the user apparatus UE and notify the base station eNB of the capability information. Configuring SCell/CG by the RRC management unit 103 includes storing information such as ID of SCell/CG in storage means as information of added SCell/CG in CA.

The measurement unit 104 includes a function configured to perform determination of start/stop of measurement, measurement, and reporting, that are described in the first and the second embodiments. The measurement unit 104 performs reception of an instruction via the DL signal reception unit 102, and performs transmission of a measurement report (CSI reporting) via the UL signal transmission unit 101.

The configuration of the user apparatus UE shown in FIG. 18 may be realized by hardware circuits (example: one or a plurality of IC chips) as a whole, or may be realized by hardware circuits for a part and by a CPU and a program for other parts.

Figure 19:
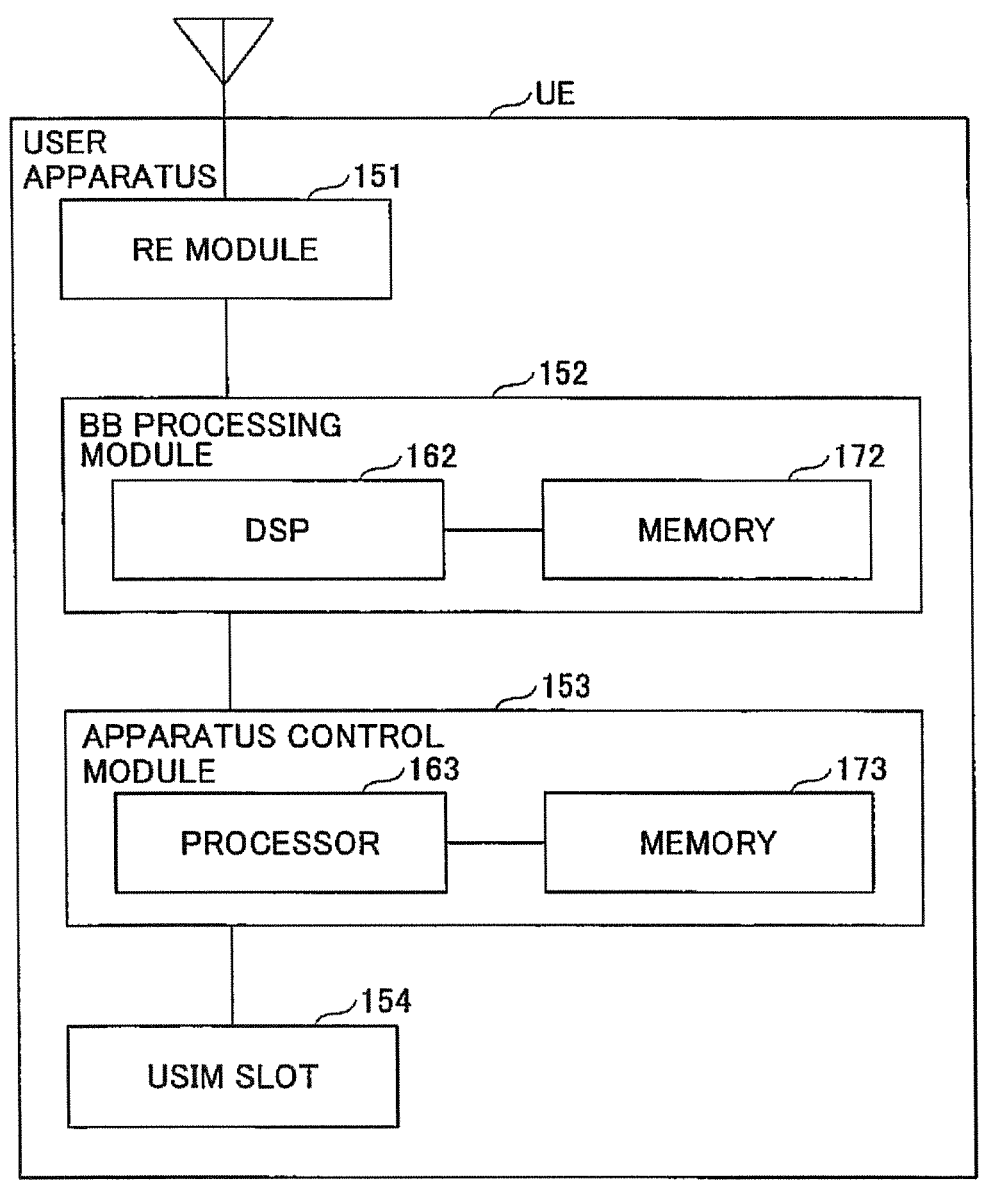
FIG. 19 is a HW block diagram of a user apparatus UE.

FIG. 19 is a diagram showing an example of a hardware (HW) configuration of the user apparatus UE. FIG. 19 shows a configuration closer to an implementation example than that of FIG. 18. As shown in FIG. 19, the UE includes an RE (Radio Equipment) module 151 for performing processing on radio signals, a BB (Base Band) processing module 152 for performing baseband signal processing, an apparatus control module 153 for performing processes of upper layer and the like, and a USIM slot 154 that is an interface for accessing a USIM card.

The RE module 151 generates a radio signal that should be transmitted from an antenna by performing D/A (Digital-to-Analog) conversion, modulation, frequency conversion, and power amplifying and the like on a digital baseband signal received from the BB processing module 152. Also, the RE module 151 generates a digital baseband signal by performing frequency conversion, A/D (Analog to Digital) conversion, demodulation and the like on a received radio signal, to pass the signal to the BB processing module 152. The RE module 151 includes, for example, functions of physical layer and the like of the UL signal transmission unit 101 and the DL signal reception unit 102 of FIG. 18.

The BB processing module 152 performs processing for converting between IP packets and digital baseband signals. The DSP (Digital Signal Processor) 162 is a processor for performing signal processing in the BB processing module 152. The memory 172 is used as a work area of the DSP 162. The BB processing module 152 includes, for example, functions of layer 2 and the like of the UL signal transmission unit 101 and the DL signal reception unit 102 of FIG. 18, and, includes the RRC processing unit 103 and the measurement unit 104. By the way, all of or a part of functions of the RRC processing unit 103 and the measurement unit 104 may be included in the apparatus control module 153.

The apparatus control module 153 performs protocol processing of IP layer, processing of various applications, and the like. The processor 163 is a processor for performing processes performed by the apparatus control module 153. The memory 173 is used as a work area of the processor 163. The processor 163 performs read and write of data with a USIM via the USIM slot 154.

Figure 20:
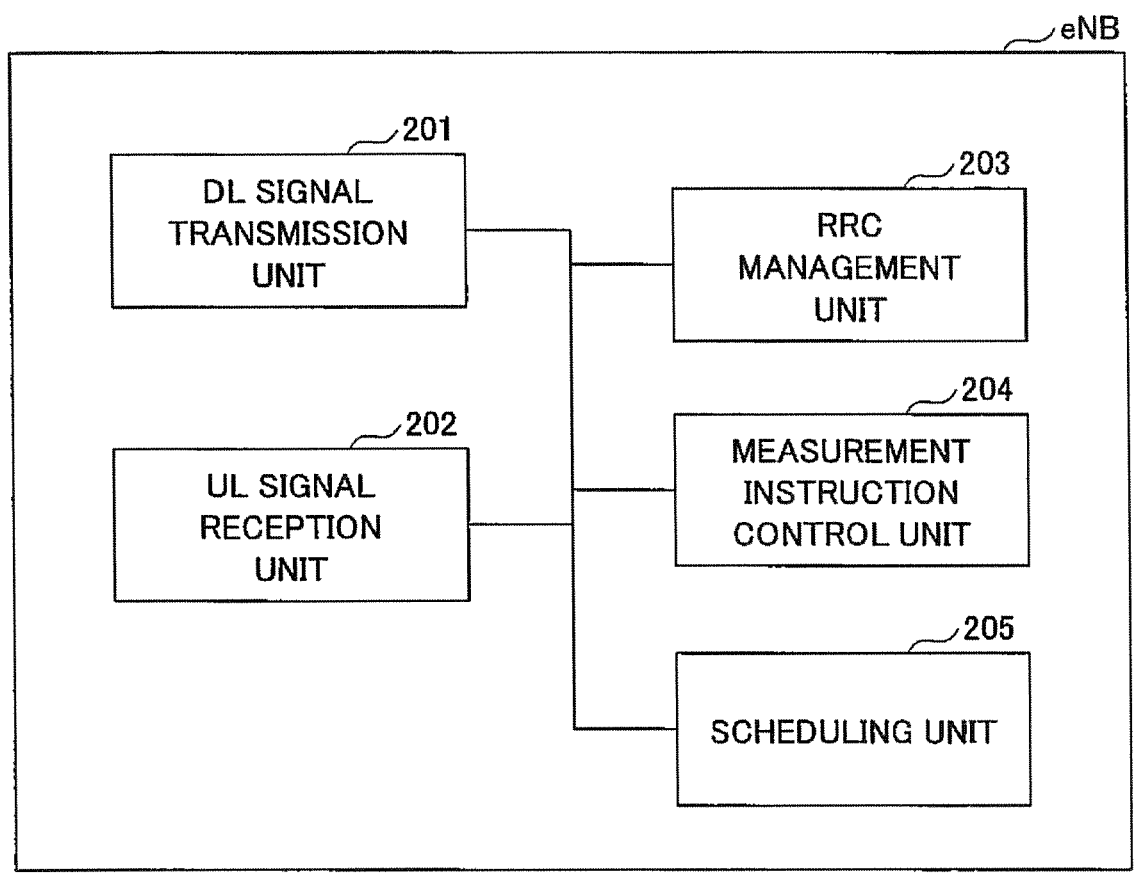
FIG. 20 is a block diagram of a base station eNB.

FIG. 20 shows a functional block diagram of the base station eNB in the present embodiment. As shown in FIG. 20, the base station eNB includes a DL signal transmission unit 201, an UL signal reception unit 202, an RRC management unit 203, a measurement instruction control unit 204 and a scheduling unit 205. FIG. 20 only shows functional units especially related to the embodiment of the present invention in the base station eNB, and the base station eNB also includes at least functions, not shown in the figure, for performing operation complying with LTE. Also, the configuration shown in FIG. 20 is merely an example, and, any functional segmentations and any names of functional units can be used as long as the base station eNB can execute processing described in the present embodiment.

The DL signal transmission unit 201 includes functions configured to generate various signals of physical layer from an upper layer signal to be transmitted from the base station eNB, and transmit the signals by radio. The UL signal reception unit 202 includes functions configured to receive various signals from each UE by radio and obtain a signal of an upper layer from the received physical layer signals. Each of the DL signal transmission unit 201 and the UL signal reception unit 202 includes a function for executing CA (including CA of DC) for performing communication by aggregating a plurality of CCs. Also, the DL signal transmission unit 201 and the UL signal reception unit 202 may be a radio communication unit, like an RRE, that is placed remotely from the body (control unit) of the base station eNB.

It is assumed that each of the DL signal transmission unit 201 and the UL signal reception unit 202 includes a packet buffer and performs processing of layer 1 (PHY), and layer 2 (MAC, RLC, PDCP) (But, it is not limited to this).

The RRC management unit 203 includes functions for performing processes of setting/changing/management of CA, configuration change and the like in addition to performing transmission and reception of an RRC message with the user apparatus UE. Since the RRC management unit 203 is a functional unit for performing setting of CA, it may be called a setting unit.

The measurement instruction control unit 204 includes functions configured to perform decision of SCell/CG measurement start/stop, and instruction transmission of SCell/CG measurement start/stop, as described in the first and the second embodiments. The scheduling unit 205 includes functions for performing scheduling for user apparatuses UE that perform CA.

The configuration of the base station eNB shown in FIG. 20 may be realized by hardware circuits (example: one or a plurality of IC chips) as a whole, or may be realized by hardware circuits for a part and by a CPU and a program for other parts.

Figure 21:
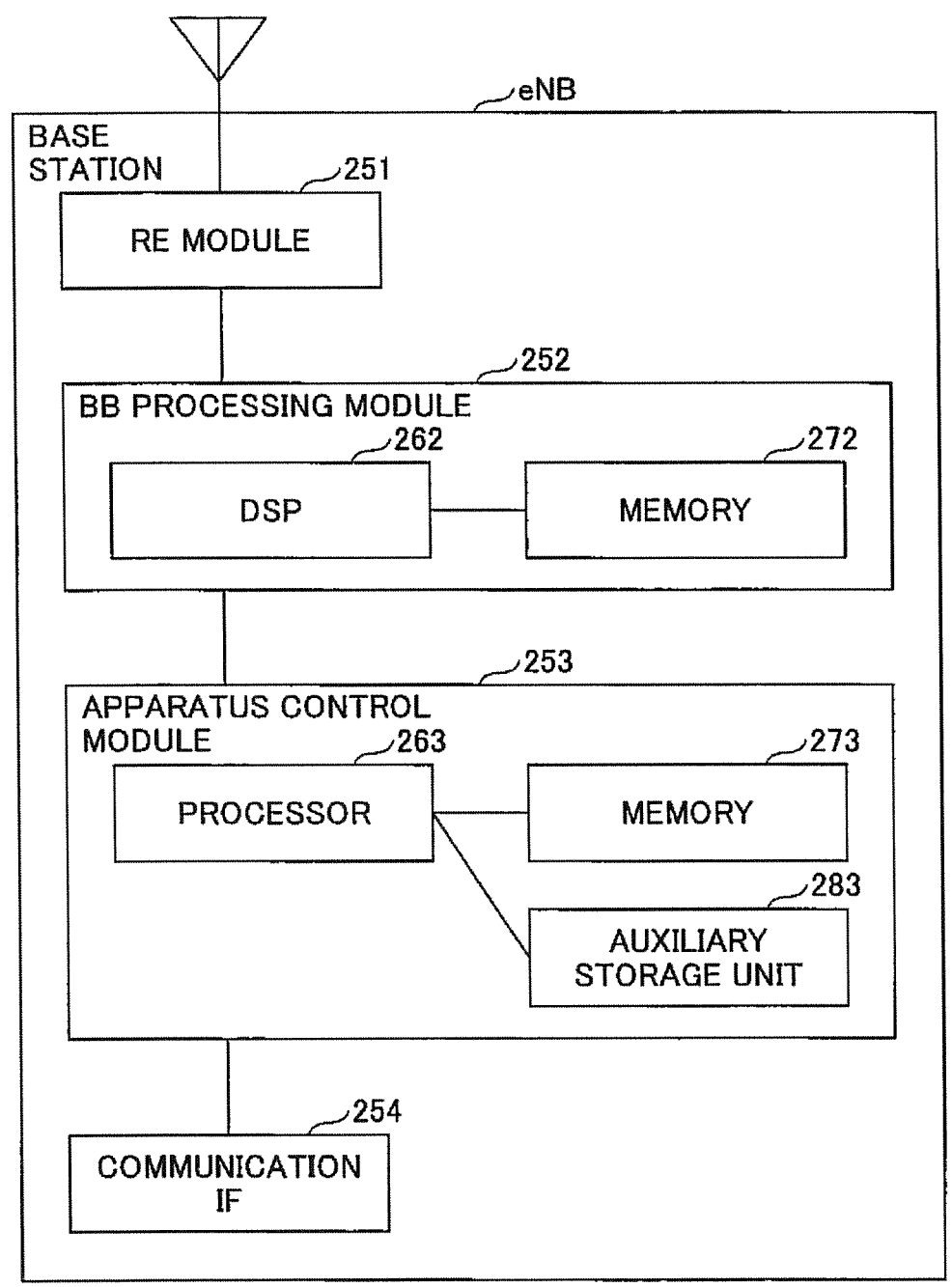
FIG. 21 is a HW block diagram of a base station eNB.

FIG. 21 is a diagram showing an example of a hardware (HW) configuration of the base station eNB. FIG. 21 shows a configuration closer to an implementation example than that of FIG. 20. As shown in FIG. 21, the base station eNB includes an RE module 251 for performing processing on radio signals, a BB processing module 252 for performing baseband signal processing, an apparatus control module 253 for perming processes of upper layer and the like, and a communication IF 254 that is an interface for connecting to a network.

The RE module 251 generates a radio signal that should be transmitted from an antenna by performing D/A conversion, modulation, frequency conversion, and power amplifying and the like on a digital baseband signal received form the BB processing module 252. Also, the RE module 251 generates a digital baseband signal by performing frequency conversion, A/D conversion, demodulation and the like on a received radio signal, to pass the signal to the BB processing module 252. The RE module 251 includes, for example, functions of physical layer and the like of the DL signal transmission unit 201 and the UL signal reception unit 202 of FIG. 20.

The BB processing module 252 performs processing for converting between IP packets and digital baseband signals. The DSP 262 is a processor for performing signal processing in the BB processing module 252. The memory 272 is used as a work area of the DSP 252. The BB processing module 252 may include, for example, functions of layer 2 and the like of the DL signal transmission unit 201 and the UL signal reception unit 202 of FIG. 20, and, include the RRC processing unit 203, the measurement instruction control unit 204 and the scheduling unit 205. By the way, all of or a part of functions of the RRC processing unit 203, the measurement instruction control unit 204 and the scheduling unit 205 may be included in the apparatus control module 253.

The apparatus control module 253 performs protocol processing of IP layer, OAM processing, and the like. The processor 263 is a processor for performing processes performed by the apparatus control module 253. The memory 273 is used as a work area of the processor 263. The auxiliary storage device 283 is, for example, an HDD and the like, and stores various setting information and the like for operation of the base station eNB itself.

Figure 22:
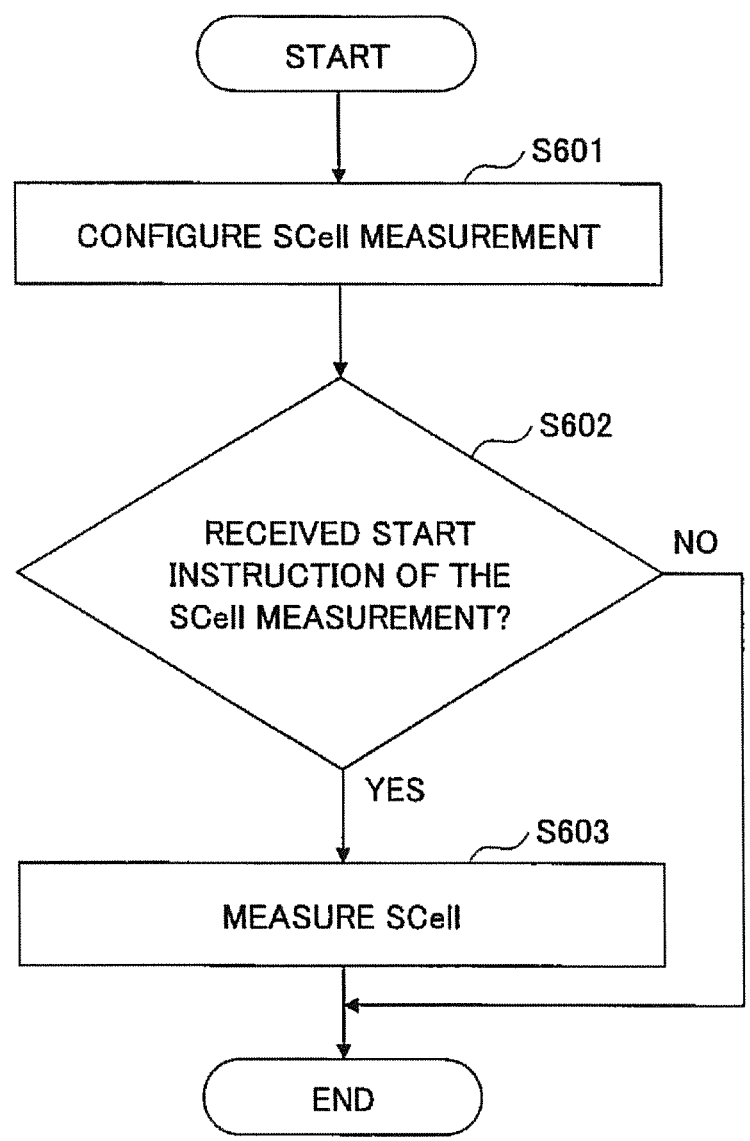
FIG. 22 is a flowchart indicating an operation example of the user apparatus UE.

As an operation example 1, FIG. 22 shows a flowchart of an operation example of the user apparatus UE in the first embodiment. Here, it is assumed that SCell addition configuration has been completed.

In step 601, based on an RRC signal from the base station eNB, SCell measurement configuration is performed by the RRC management unit 103 of the user apparatus UE.

In step 602, the measurement unit 104 determines whether an instruction of start of SCell measurement related to the measurement configuration is received from the base station eNB. If it is received (Yes in step 602), the measurement unit 104 performs measurement of the SCell, and generates a measurement report to transmit the measurement report by instructing the UL signal transmission unit 101 to transmit the measurement report (step 603).

As an operation example 2, FIG. 23 shows a flowchart of an operation example of the user apparatus in the second embodiment.

In step 701, based on an RRC signal from the base station eNB, SCell addition configuration is performed by the RRC management unit 103 of the user apparatus UE.

In step 702, the measurement unit 104 determines whether a start instruction of measurement/reporting of the added SCell is received from the base station eNB. If it is received (Yes in step 702), the measurement unit 104 performs measurement of the SCell, and generates a CSI to perform CSI reporting by instructing the UL signal transmission unit 101 to perform CSI report transmission (step 703).

(Summary of Embodiments)

As described above, in the present embodiment, there is provided a user apparatus configured to communicate with a base station in a mobile communication system that supports carrier aggregation, including:

a management unit configured to receive, from the base station, a configuration message for adding a cell or a cell group in the carrier aggregation, and perform configuration of the cell or the cell group, and to receive, from the base station, measurement configuration information on measurement of the cell or the cell group; and a measurement unit configured to allow not to perform measurement of the cell or the cell group based on the measurement configuration information until a predetermined condition is satisfied, and to perform measurement of the cell or the cell group based on the measurement configuration information when the predetermined condition is satisfied to transmit a measurement report to the base station.

According to this configuration, it becomes possible to perform quality measurement of a cell used in carrier aggregation while suppressing battery consumption.

The predetermined condition is, for example, that the measurement unit receives a measurement start instruction from the base station. According to this configuration, since the user apparatus can perform measurement start determination by an instruction from the base station, processing on measurement start determination in the user apparatus can be easily realized.

The measurement unit may be configured to stop measurement of the cell or the cell group when a predetermined period elapses after receiving the measurement start instruction, or when receiving a measurement stop instruction from the base station. According to this configuration, the user apparatus can properly perform measurement stop so that useless measurement operation can be avoided.

The predetermined condition may be that quality of a specific cell or a specific cell group becomes lower than a predetermined value, or that the number of cells or cell groups that satisfy a specific quality condition becomes less than a predetermined value. According to this configuration, since the user apparatus can autonomously determine measurement start, the user apparatus can perform proper measurement start control even when the base station does not support a measurement start instruction.

Also, in the present embodiment, there is provided a user apparatus configured to communicate with a base station in a mobile communication system that supports carrier aggregation, including:

a management unit configured to receive, from the base station, a configuration message for adding a cell or a cell group in the carrier aggregation, and perform configuration of the cell or the cell group;

a measurement unit configured to perform measurement of a channel state of the cell or the cell group without activating the cell or the cell group that is in a deactivated state, and to transmit channel state information of the cell or the cell group to the base station; and a communication unit configured to activate the cell or the cell group when receiving an activation instruction of the cell or the cell group from the base station after transmission of channel state information of the cell or the cell group is performed by the measurement unit.

According to this configuration, it becomes possible to perform quality measurement of a cell used in carrier aggregation while suppressing battery consumption.

The measurement unit may be configured to start the measurement after a predetermined period from when receiving a measurement start instruction from the base station. According to this configuration, the user apparatus and the base station can have the same recognition of measurement start timing, so that the base station can perform quality decision quickly.

The measurement unit may be configured to utilize an uplink radio resource prepared for transmitting channel state information of another cell or cell group as an uplink radio resource used for transmitting channel state information of the cell or the cell group to the base station. According to this configuration, channel state information on added cell or cell group can be transmitted without preparing additional resource.

The management unit may be configured to notify the base station of capability information including the number of cells or cell groups that can be activated at the same time in the user apparatus. According to this configuration, the base station can ascertain the number of cells or cell groups that can be activated at the same time in the user apparatus.

The user apparatus UE described in an embodiment of the present invention may include a CPU and a memory and may be realized by executing a program by the CPU (processor), or may be realized by hardware such as hardware circuits including logics of processing described in the first and the second embodiments, or may be configured by coexistence of a program and hardware.

The base station eNB described in an embodiment of the present invention may include a CPU and a memory and may be realized by executing a program by the CPU (processor), or may be realized by hardware such as hardware circuits including logics of processing described in the first and the second embodiments, or may be configured by coexistence of a program and hardware.

In the above, the embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, such apparatuses may be implemented in hardware, software, or a combination thereof.

The software that operates by a processor provided in the user apparatus according to an embodiment of the present invention, and the software that operates by a processor provided in the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2015-015999, filed in the JPO on Jan. 29, 2015, and the entire contents of the Japanese patent application No. 2015-015999 are incorporated herein by reference.

DESCRIPTION OF REFERENCE SIGNS

UE user apparatus
eNB base station
101 UL signal transmission unit
102 DL signal reception unit
103 RRC management unit
104 measurement unit
151 RE module
152 BB processing module
153 apparatus control module
154 USIM slot
201 DL signal transmission unit
202 UL signal reception unit
203 RRC management unit
204 measurement instruction control unit
205 scheduling unit
251 RE module
252 BB processing module
253 apparatus control module
254 communication IF

The invention claimed is:

1. A user apparatus configured to communicate with a base station in a mobile communication system that supports carrier aggregation, comprising:
a management unit configured to receive, from the base station, a configuration message for adding a cell or a cell group in the carrier aggregation, and perform configuration of the cell or the cell group, and to receive, from the base station, measurement configuration information on measurement of the cell or the cell group; and
a measurement unit configured to allow not to perform measurement of the cell or the cell group based on the measurement configuration information until a predetermined condition is satisfied, and to perform measurement of the cell or the cell group based on the measurement configuration information when the predetermined condition is satisfied to transmit a measurement report to the base station,
wherein the predetermined condition is that the measurement unit receives a measurement start instruction from the base station,
wherein the measurement start instruction is separate from the configuration message and the measurement configuration information, and
wherein the measurement start instruction comprises a Medium Access Control (MAC) Control Element (CE).

2. The user apparatus as claimed in claim 1, wherein the measurement unit is configured to stop measurement of the cell or the cell group when a predetermined period elapses after receiving the measurement start instruction, or when receiving a measurement stop instruction from the base station.

3. The user apparatus as claimed in claim 2, wherein the management unit is configured to notify the base station of capability information including the number of cells or cell groups that can be activated at the same time in the user apparatus.

4. The user apparatus as claimed in claim 1, wherein the predetermined condition is that quality of a specific cell or a specific cell group becomes lower than a predetermined value, or that the number of cells or cell groups that satisfy a specific quality condition becomes less than a predetermined value.

5. The user apparatus as claimed in claim 4, wherein the management unit is configured to notify the base station of capability information including the number of cells or cell groups that can be activated at the same time in the user apparatus.

6. The user apparatus as claimed in claim 1, wherein the management unit is configured to notify the base station of capability information including the number of cells or cell groups that can be activated at the same time in the user apparatus.

7. A cell measurement method performed by a user apparatus configured to communicate with a base station in a mobile communication system that supports carrier aggregation, comprising:
a step of receiving, from the base station, a configuration message for adding a cell or a cell group in the carrier aggregation, performing configuration of the cell or the cell group, and receiving, from the base station, measurement configuration information on measurement of the cell or the cell group; and
a step of not performing measurement of the cell or the cell group based on the measurement configuration information until a predetermined condition is satisfied, and performing measurement of the cell or the cell group based on the measurement configuration information when the predetermined condition is satisfied to transmit a measurement report to the base station,
wherein the predetermined condition is the reception of a measurement start instruction from the base station,
wherein the measurement start instruction is separate from the configuration message and the measurement configuration information, and
wherein the measurement start instruction comprises a Medium Access Control (MAC) Control Element (CE).

* * * * *